United States Patent
Takei et al.

(10) Patent No.: US 12,097,874 B2
(45) Date of Patent: Sep. 24, 2024

(54) SYSTEM IN FACILITY AND ELECTRIC MOBILITY VEHICLE

(71) Applicant: WHILL, Inc., Tokyo (JP)

(72) Inventors: Yusuke Takei, Tokyo (JP); Kharisma Adi Perdana Nitiputra, Tokyo (JP); Wei Shun Kao, Tokyo (JP)

(73) Assignee: Whill, Inc., Tokyo (JP)

( * ) Notice: Subject to any disclaimer, the term of this patent is extended or adjusted under 35 U.S.C. 154(b) by 260 days.

(21) Appl. No.: 17/772,455

(22) PCT Filed: Oct. 28, 2020

(86) PCT No.: PCT/JP2020/040337
§ 371 (c)(1),
(2) Date: Apr. 27, 2022

(87) PCT Pub. No.: WO2021/085446
PCT Pub. Date: May 6, 2021

(65) Prior Publication Data
US 2022/0371616 A1    Nov. 24, 2022

(30) Foreign Application Priority Data

Oct. 29, 2019    (JP) .................................. 2019-196282

(51) Int. Cl.
*B60W 60/00*     (2020.01)
*B60R 22/48*     (2006.01)
(Continued)

(52) U.S. Cl.
CPC ........... *B60W 60/001* (2020.02); *B60R 22/48* (2013.01); *G07C 5/008* (2013.01); *B60R 2022/4866* (2013.01); *B60W 2556/45* (2020.02)

(58) Field of Classification Search
CPC ......... G05D 1/02; B60R 22/48; B60W 60/00; G01C 21/26
See application file for complete search history.

(56) References Cited

U.S. PATENT DOCUMENTS

| 10,528,132 B1* | 1/2020 | Hassani ............... B60K 35/211 |
| 11,747,155 B2* | 9/2023 | Wang ................... G05D 1/0274 |
| | | 701/410 |
| 2015/0199619 A1* | 7/2015 | Ichinose ................ G06Q 10/02 |
| | | 705/5 |

(Continued)

FOREIGN PATENT DOCUMENTS

| EP | 3336642 A1 | 6/2018 |
| EP | 3503068 A1 | 6/2019 |

(Continued)

OTHER PUBLICATIONS

International Search Report for International Application No. PCT/JP2020/040337 mailed from the International Searching Authority (JP) on Jan. 19, 2021, 5 pages.

*Primary Examiner* — Tan Q Nguyen
(74) *Attorney, Agent, or Firm* — BainwoodHuang

(57) ABSTRACT

A system in facility includes a plurality of electric mobility vehicles, and a server which stores information of the electric mobility vehicles. In this system in facility, a user operates one of the electric mobility vehicles to move the electric mobility vehicle, after the user finishes using the electric mobility vehicle, the electric mobility vehicle moves to a standby area by automatic driving, and usage information of the electric mobility vehicle by the user is stored in a management data in a server, and at least one of a seating sensor for a seat unit and a occupancy sensor for a luggage carrier of the electric mobility vehicle is provided in each of the electric mobility vehicles.

17 Claims, 15 Drawing Sheets

(51) Int. Cl.
*G07C 5/00* (2006.01)
*G01C 21/26* (2006.01)

(56) References Cited

U.S. PATENT DOCUMENTS

| | | | |
|---|---|---|---|
| 2017/0123423 A1 | 5/2017 | Sako et al. | |
| 2018/0053412 A1* | 2/2018 | Iagnemma | H04M 1/72403 |
| 2018/0101179 A1* | 4/2018 | Louey | B60L 53/14 |
| 2018/0216545 A1* | 8/2018 | Kurata | F02B 61/02 |
| 2018/0246514 A1 | 8/2018 | Mitomo et al. | |
| 2019/0041855 A1* | 2/2019 | Suzuki | G05D 1/0088 |
| 2019/0212732 A1 | 7/2019 | Takanashi et al. | |
| 2019/0263281 A1* | 8/2019 | Wang | B60L 53/60 |
| 2020/0241532 A1 | 7/2020 | Suzuki et al. | |
| 2021/0004008 A1 | 1/2021 | Mitomo et al. | |
| 2021/0031848 A1* | 2/2021 | Du | B60R 25/32 |
| 2021/0080274 A1 | 3/2021 | Uematsu et al. | |

FOREIGN PATENT DOCUMENTS

| | | |
|---|---|---|
| JP | H11231935 A | 8/1999 |
| JP | 2003024390 A | 1/2003 |
| JP | 2003038580 A | 2/2003 |
| JP | 2004229716 A | 8/2004 |
| JP | 2012226601 A | 11/2012 |
| JP | 2016027456 A | 2/2016 |
| JP | 2017046491 A | 3/2017 |
| JP | 2018065544 A | 4/2018 |
| JP | 2018160270 A | 10/2018 |
| JP | 2018169787 A | 11/2018 |
| JP | 2019144167 A | 8/2019 |
| WO | 20150166811 A1 | 11/2015 |
| WO | 20170029982 A1 | 2/2017 |
| WO | 20180037945 A1 | 3/2018 |
| WO | 20180123032 A1 | 7/2018 |
| WO | WO-2018123032 A1 * | 7/2018 ............. G06Q 30/06 |

* cited by examiner

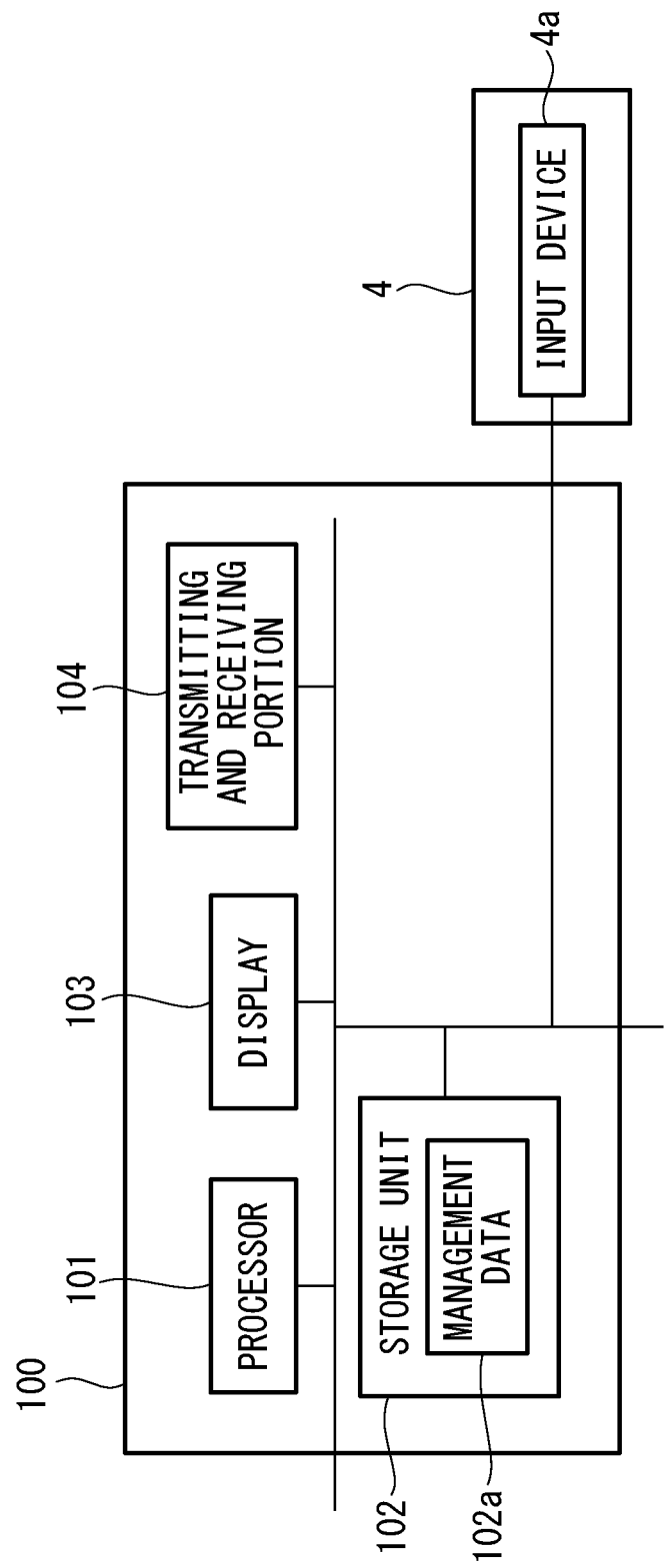

FIG. 9

| | IDENTIFIER | CHARGE STATE | ESTIMATED CHARGE STATE | TRAVEL STATE | SEATING SENSOR | LUGGAGE | LOCATION |
|---|---|---|---|---|---|---|---|
| ELECTRIC MOBILITY | 1 | 80% | 60% | MANUAL: TRAVELLING | YES | YES | AREA D |
| ELECTRIC MOBILITY | 2 | 90% | — | MANUAL: STOP | NO | NO | AREA A |
| ELECTRIC MOBILITY | 3 | 50% | 15% | AUTOMATIC: TRAVELLING | NO | NO | AREA F |
| ... | | | | ... | | | |
| OPERATOR | A | — | — | — | — | — | AREA D |
| OPERATOR | B | — | — | — | — | — | AREA E |

OCTOBER 10　　CURRENT TIME ▽

8:00　9:00　10:00　11:00　12:00

- USER A IS USING — RESERVED BY USER B
- FINISHED USING BY USER C
- ATTENDING USER D

SYSTEM IN FACILITY AND ELECTRIC MOBILITY VEHICLE

CROSS-REFERENCE TO RELATED APPLICATION(S)

This application is based upon and claims the benefit of priority from Japanese Patent Application No. 2019-196282 filed on Oct. 29, 2019, the entire contents of which are incorporated herein by reference.

TECHNICAL FIELD

This invention relates to a system in facility and an electric mobility vehicle.

BACKGROUND ART

As this kind of system in facility, there is a known system in facility in which a plurality of electric mobility vehicles are used, and a user manually moves one of the electric mobility vehicles in a facility, and after the user finishes using the electric mobility vehicle, the electric mobility vehicle returns to a standby area by automatic driving. See PTL 1, for example.

CITATION LIST

Patent Literature

{PTL 1} Japanese Unexamined Patent Application, Publication No. 2009-144167

SUMMARY OF INVENTION

A first aspect of this invention is a system in facility including: a plurality of electric mobility vehicles; and a server which stores information of the plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving, wherein usage information of the one of the electric mobility vehicles by the user is stored in a management data of the server, and at least one of a seating sensor for a seat unit of the electric mobility and an occupancy sensor for a luggage carrier of the electric mobility is provide in each of the electric mobility vehicles.

A second aspect of the present invention is a system in facility comprising a plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving, wherein at least one of a seating sensor of a seat unit of the electric mobility and a occupancy sensor of a luggage carrier of the electric mobility is provided in each of the electric mobility vehicles, and a controller of the one of the electric mobility vehicles uses at least one of a detection result of the seating sensor and a detection result of the occupancy sensor to determine termination of use of the one of the electric mobility vehicles by the user.

A third aspect of the present invention is an electric mobility vehicle including a wheel; a motor which drives the wheel; and at least one of a seating sensor for a seat unit and an occupancy sensor for a luggage carrier, wherein in a user-using state, the electric mobility vehicle is controlled in an automatic driving mode or in a manual operation mode which is based on an input to an input portion provided in the electric mobility vehicle, wherein the user-using state is at least one of a state where the seating sensor is detecting sitting of a user and a state where the occupancy sensor is detecting a luggage on the luggage carrier, and wherein in at least one of the state where the seating sensor is detecting the sitting of the user and the state where the occupancy sensor is detecting the luggage on the luggage carrier, and when the motor is controlled by automatic driving or an input made to a predetermined remote control device, the electric mobility vehicle performs at least one of quick stop of the electric mobility vehicle, sharp deceleration of the electric mobility vehicle, rapid acceleration of the electric mobility vehicle, reducing a minimum rotation radius of the electric mobility vehicle, and increasing a maximum speed of the electric mobility vehicle, which are not performed in the user-using state.

BRIEF DESCRIPTION OF DRAWINGS

FIG. 8 is a block diagram of a management server used in this embodiment.

FIG. 9 is a time table showing one example of a management data of this embodiment.

DESCRIPTION OF EMBODIMENTS

A system in an airport (a facility) according to a first embodiment of the present invention will be described below with reference to the accompanying drawings.

There is a concept of a sharing service of electric mobility vehicles, however, age, physical condition, languages, common sense, and the like of the users are different by person. Therefore, practically, it is difficult to provide this kind of service stably.

The following embodiments are made considering the aforementioned circumstances. A system in facility and an electric mobility vehicle which are capable of stably providing a sharing service using a plurality of electric mobility vehicles are desired.

Figure 1:
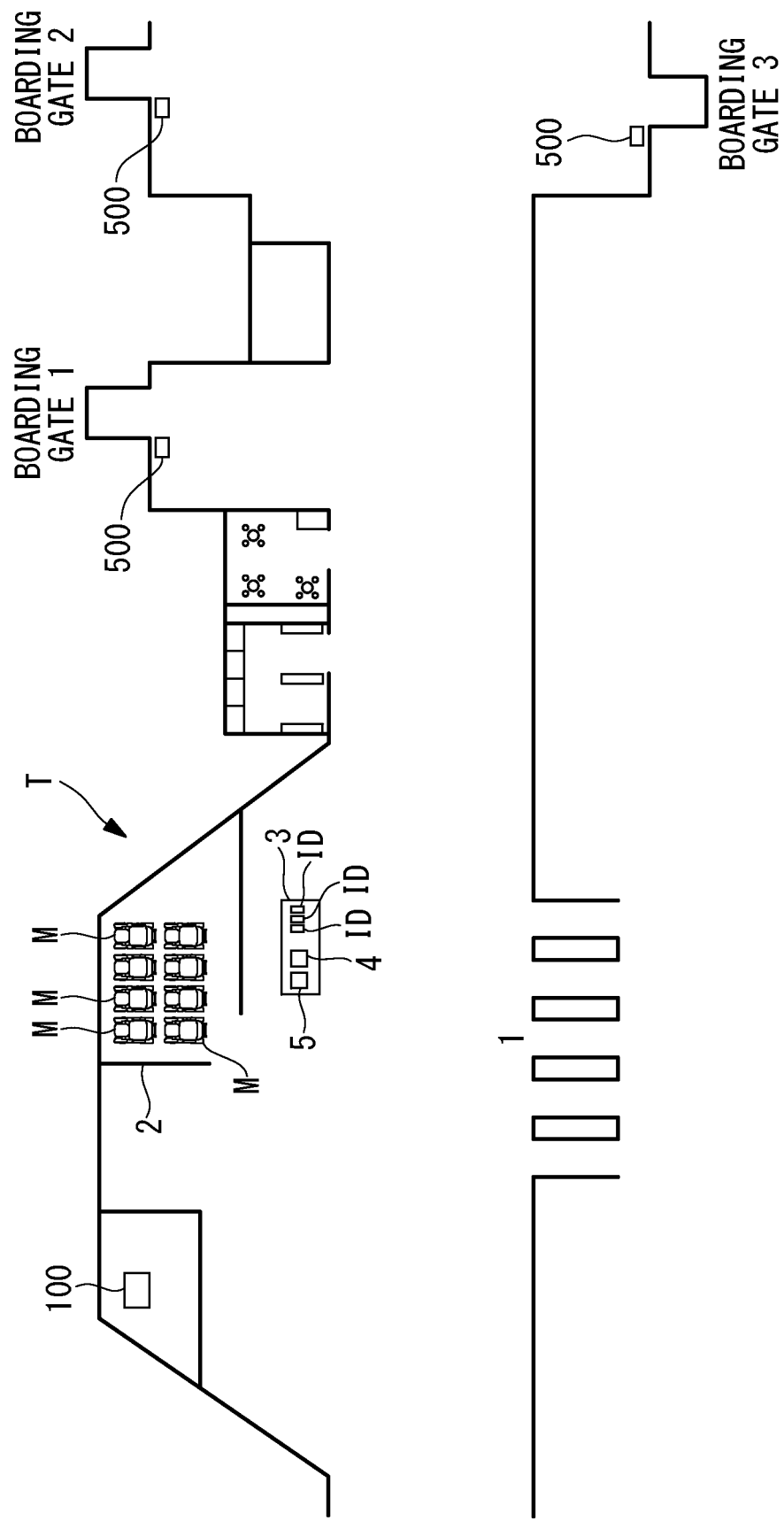
FIG. 1 is a schematic view of a system in an airport terminal T according to a first embodiment of the present invention.

As shown in FIG. 1, this system includes a plurality of electric mobility vehicles M placed in an airport terminal T, and a server 100 which is a management server and which manages the plurality of electric mobility vehicles M. The server 100 may not be placed in the airport.

Firstly, the electric mobility vehicle M of this embodiment, on which one person to be seated to ride, will be described briefly. Note that, in this system, an electric mobility vehicle other than the electric mobility vehicle M described in this embodiment can be used.

Figure 2:
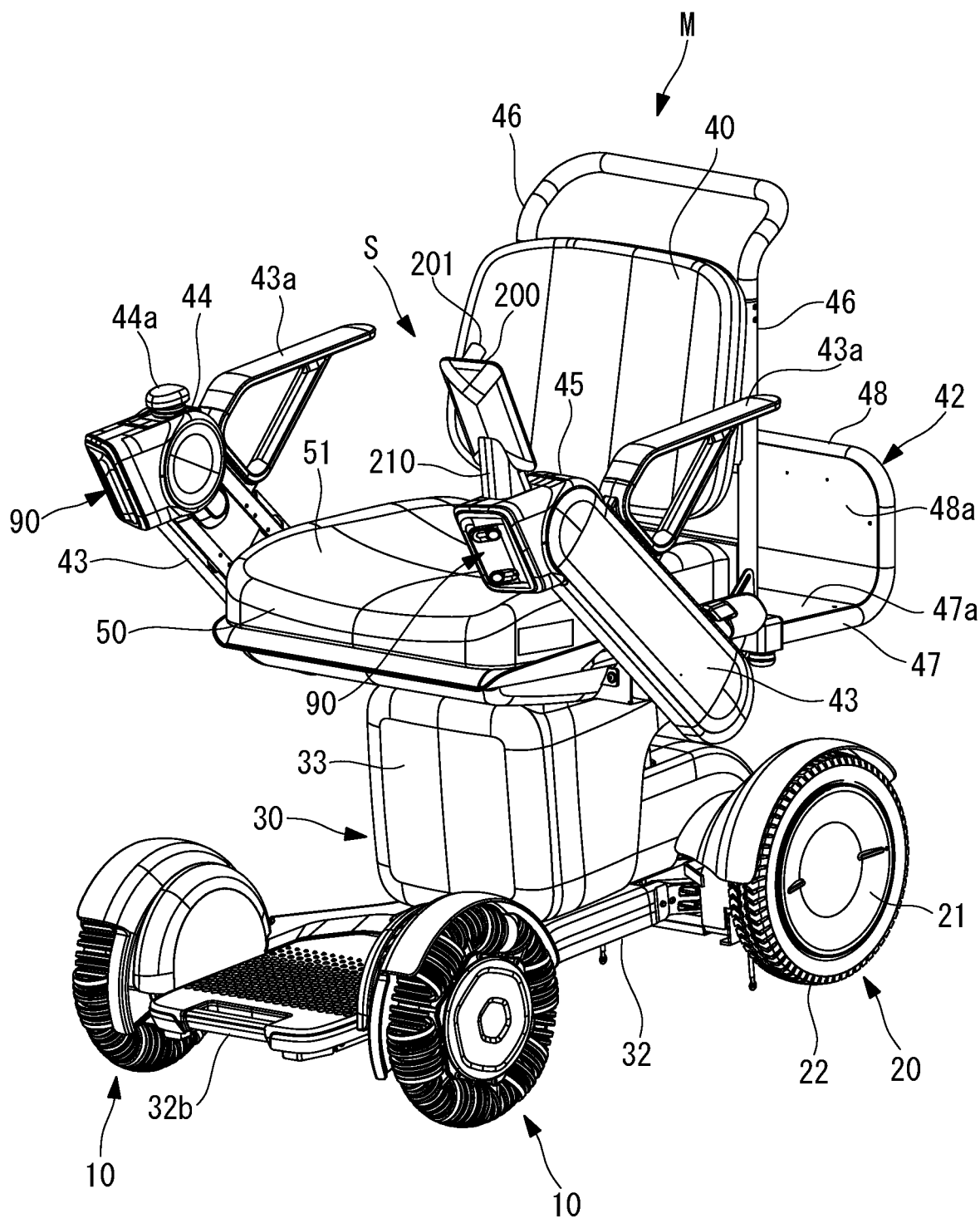
FIG. 2 is a perspective view of an electric mobility vehicle used in this embodiment.
Figure 3:
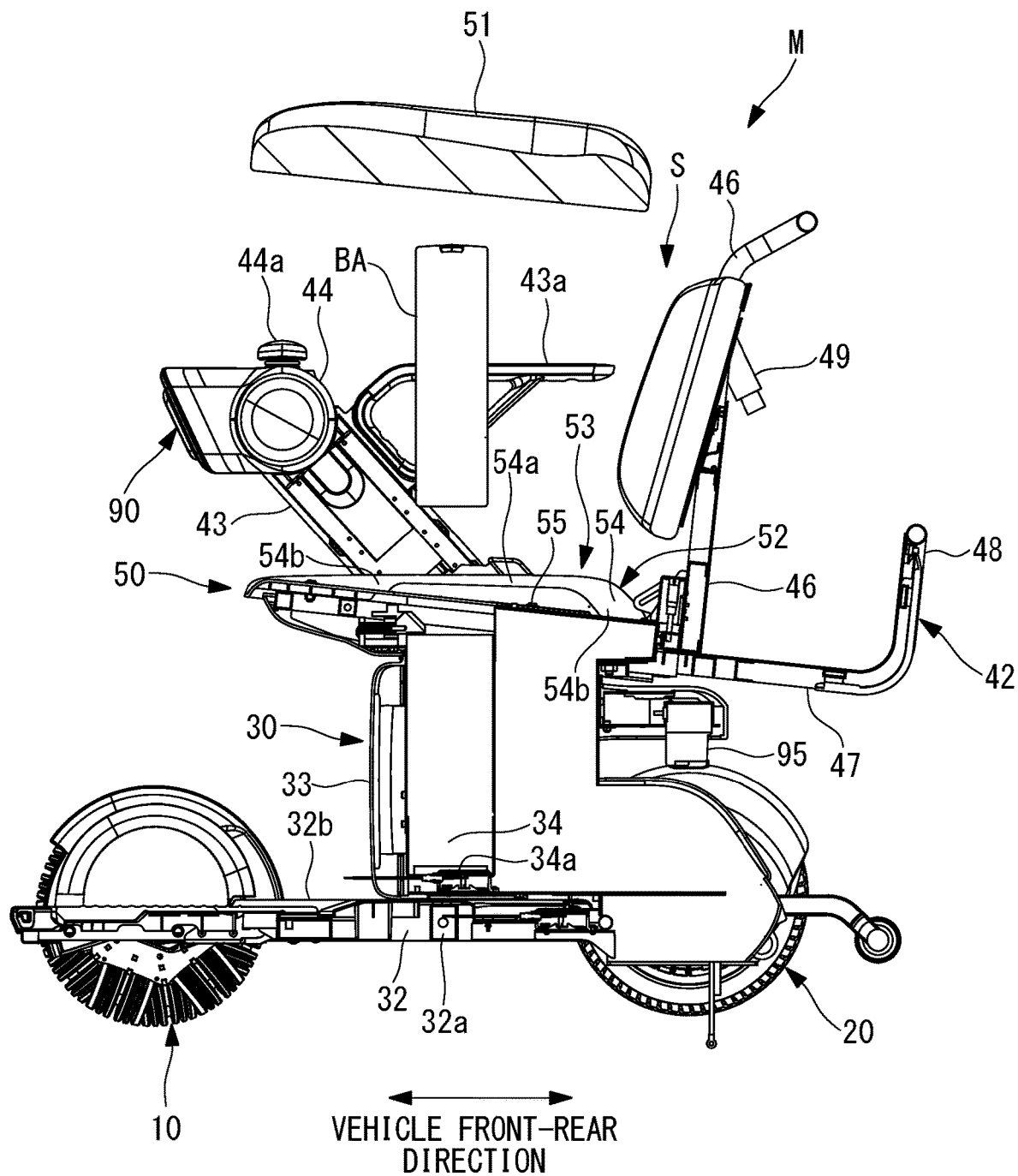
FIG. 3 is a partially exploded sectional view of the electric mobility vehicle of this embodiment.
Figure 4:
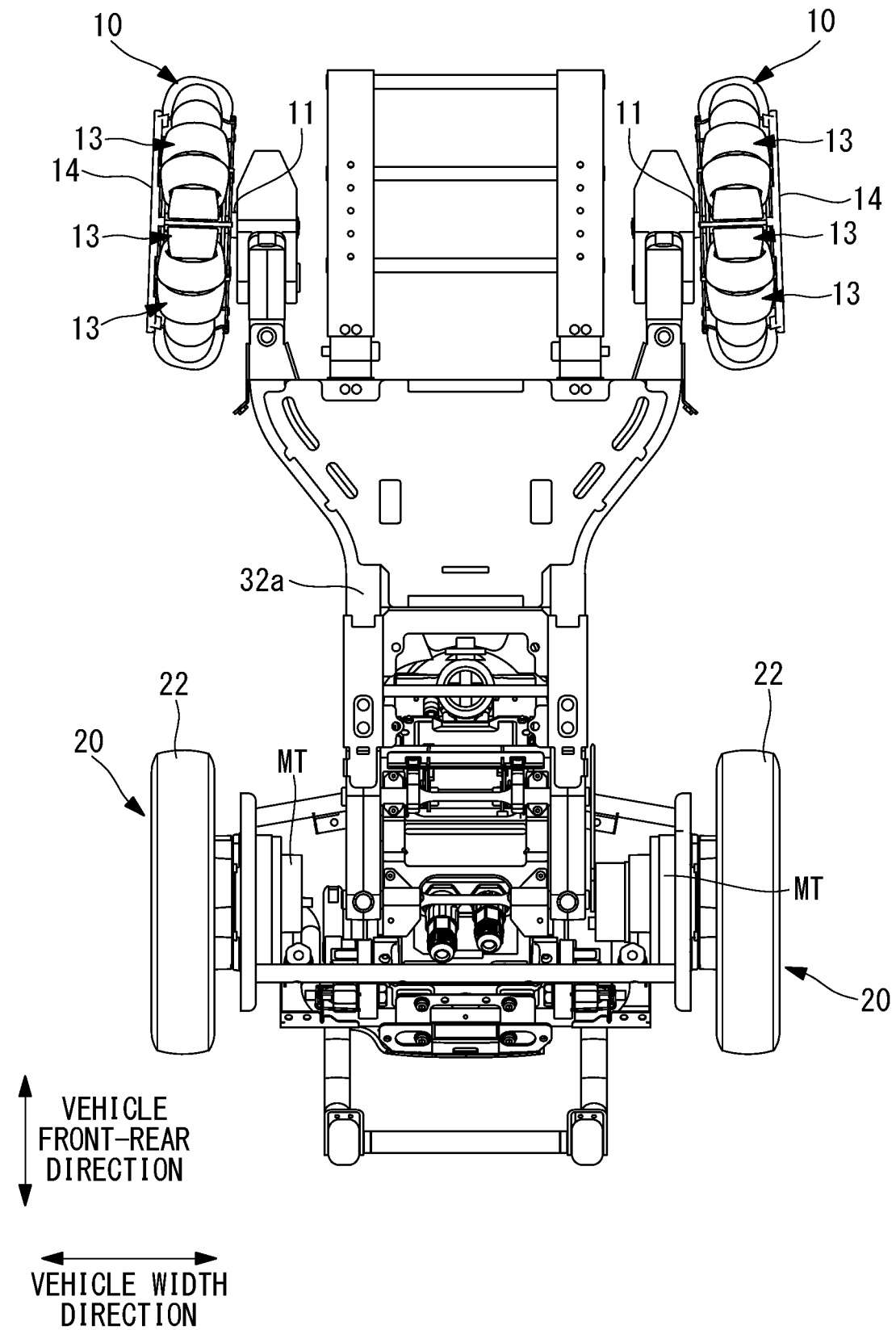
FIG. 4 is a bottom view of this embodiment in a state where a seat unit, cover portion, and the like are removed from the electric mobility.

As shown in FIGS. 2 to 4, this electric mobility vehicle M includes a mobility body 30 having a pair of front wheels (wheels) 10, a pair of rear wheels (wheels) 20, a mobility main body 30 which is supported by the front wheels 10 and the rear wheels 20, and a seat unit S which is attached to the mobility body 30. Another wheel may be provided in the mobility body 30 in addition to the front wheels 10 and the rear wheels 20, and the number of the front wheels 10 and the rear wheels 20 may be different from those described above. The pair of front wheels 10 and the pair of rear wheels 20 may not be provided.

The mobility body 30 has motors MT which drive at least either of the pair of front wheels 10 and the pair of rear wheels 20.

In the description of this embodiment, a vehicle front-rear direction shown in FIGS. 3 and 4 may be referred to as a front-rear direction in the following description, and a vehicle width direction shown in FIGS. 3 and 4 may be referred to as a width direction or left-right direction in the following description. Note that, the vehicle front-rear direction and the front-rear direction of the electric mobility vehicle M and the mobility body 30 are identical with each other, and the vehicle width direction and the width direction of the electric mobility vehicle M and the mobility body 30 are identical with each other.

In this embodiment, the pair of rear wheels 20 are respectively connected to the motors MT, and each of the motors MT drives the corresponding rear wheel 20. Driving force of the motors MT may be transmitted to the corresponding front wheels 10 via a driving force transmitting means. The driving force transmitting means is a belt, gear, or the like.

Each of the front wheels 10 includes a hub 14 attached to an axle 11, and a plurality of roller support shafts (not shown) which are supported by the hub 14, and a plurality of rollers 13 are respectively supported by the roller support shafts so as to be rotatable. Note that, the hub 14 may be attached to the axle 11 by means of a bearing and the like, and the hub 14 may be attached to the axle 11 by means of a cushioning material, an intermediate member, or the like.

The rollers 13 rotate around axis lines of the corresponding roller support shafts. That is to say, an outer surface of each of the front wheels 10 is formed by the plurality of rollers 13, and the front wheels 10 are omnidirectional wheels which move in every direction with respect to a travel surface.

In this embodiment, the rear wheels 20 include an axle which is not shown, a hub 21 attached to the axle, and an outer circumferential member 22 which is provided on the outer circumferential side of the hub 21, and the outer circumferential surface thereof is formed by using a material having rubber-like elasticity, however, the omnidirectional wheels may be used as the rear wheels 20, which are the same as the front wheels 10. The axle of the rear wheels 20 may be the same shaft with a main shaft of the motor MT.

Structure of the mobility body 30 is changeable as required. In this embodiment, the mobility body 30 includes a base portion 32 which extends along the ground, and a seat support portion 33 which extends toward an upper side from a rear end side or the center portion of the base portion 32. The seat unit S is attached to the upper end side of the seat support portion 33.

The base portion 32 of this embodiment includes a plastic cover portion 32b, which is shown in FIG. 3, which at least partially covers the metal base frame 32a. The cover portion 32b is used as a portion for putting feet of a driver (a user) seated on the seat unit S, a portion for placing luggage, or the like.

In this embodiment, the seat unit S has a backrest portion 40, and a seat surface portion 50. The backrest portion 40 extends from a rear end of the seat surface portion 50 toward the upper side. A cushion 51 of the seat surface portion 50 is removable, and when the cushion 51 is removed, an upper surface of the seat support portion 33 and/or an under part structure 52 of the seat surface portion 50 is exposed.

In the seat support portion 33, a battery housing portion 34 which extends in a vertical direction is formed, and a battery BA having a longitudinal length in the vertical direction is accommodated in the battery housing portion 34. A connector 43a is provided in the battery housing portion 34, and when the battery BA is accommodated in the battery housing portion 43, a connector (not shown) of the battery BA is connected to the connector 34a. Also, an operator can access to the battery BA for a purpose of changing the battery BA and the like by removing the cushion 51 of the seat surface portion 50.

As shown in FIG. 3, a seating sensor 53 is provided as a part of the under part structure 52 of the seat surface portion 50 in the upper end portion of the seat support portion 33. The seating sensor 53 includes a flexible member 54 supported at the upper end portion of the seat support member 33, and a detection device 55 positioned under the flexible member 54. The detection device 55 is a switch, a pressure sensor, or the like. In this embodiment, the detection device 55 is a switch. Also, the detection device 55 may be a deflection sensor attached at the flexible member 54. As described above, the detection device 55 may be a device which is capable of detecting deflection of the flexible member 54.

In this embodiment, a part of the flexible member 54, for example, the center side thereof, is elastically deformed toward the lower side and the switch is pushed, and because of the switch which is being pushed, a predetermined signal (electric current) or the like is sent from the detection device 55 to a controller 80, which is described below. Also, when the cushion 51 is placed on the flexible member 54 and a passenger (a user) is seated on the cushion 51, a part of the flexible member 54 is elastically deformed and pushes the switch, accordingly, the controller 80 recognizes that the passenger is seated on the seat surface portion 51.

Sensitivity of the seating sensor 53 can be set in various ways depending on a deflection amount with respect to a load of the flexible member 54. For example, when an object whose weigh is about 500 g is placed on the cushion 51, the flexible member 54 may elastically be deformed and push the switch.

In this embodiment, the flexible member 54 includes an extended portion 54a extending in a vehicle front-rear direction and a vehicle width direction, and a support portion 54*b* which supports an end portion of the extended portion 54*a*. More specifically, a plurality of support portions 54*b* extend in a lower side from both end portions of the extended portion 54*a* in a front-rear direction, and the extended portion 54*a* is supported at an upper end portion of a seat support portion 33 by the plurality of support portions 54*b*. When the flexible member 54 and the detection device 55 are provided at a side of the seat support portion 33, influence on the detection sensitivity of the detection device 55, which is caused by handling of the cushion 51 or an attachment state of the cushion 51, is reduced.

Also, the flexible member 54 may be provided at the lower part of the cushion 51. The extended portion 54*a* of the flexible member 54 is provided at the lower part of the cushion 51, and the support portion 54*b* of the flexible member 54 may be provided at the upper end portion of the seat support portion 33. In this case, the extended portion 54*a* and the support portion 54*b* are manufactured separately. In this case, the seating sensor 53 is provided both in the cushion 51 and the under part structure 52 of the seat surface portion 50. Also, the flexible member 54 and the detection device 55 may be provided in the cushion 51. In this case, the seating sensor 53 is provided in the cushion 51 on the seat surface portion 50. And, as the seating sensor 53, it is possible to use a sensor having another aspect for detecting riding of the passenger on the cushion.

The seat unit U has a right control arm 43, and a left control arm 43.

An armrest 43*a* is fixed to the upper surface of each of the control arms 43. For example, the driver (user) puts the arms on the armrests 43*a* of the pair of the control arms 43, respectively. Also, the driver puts the arms on the upper ends of the pair of control arms 43, respectively. In this embodiment, both of the control arms 43 and the armrests 43*a* are provided, however, the control arms 43 or the armrests 43*a* may only be provided. In this case, the driver puts at least one of the arm and the hand on the control arm 43, or puts at least one of the arm and the hand on the armrest 43*a*.

An operation portion 44 having an operation lever 44*a* is provided at the right control arm 43, or at the upper end of the armrest. In such a state where no force is applied, the operation lever 44*a* is positioned at a neutral position by a springy member (not shown) which is located within the operation portion 44.

A signal, which is in response to displacement direction and displacement amount of the operation lever 44*a*, is sent from the operation portion 44 to the control unit 60, which will be described below, and the control unit 60 controls the motors MT in response to the received signal.

A setting portion 45, which is for performing various sorts of settings related to the electric mobility vehicle, is provided at the upper end of the left control arm 43 or the arm rest 43*a*. Examples of the various sorts of settings include settings of maximum speed, settings regarding a driving mode, and settings for locking the electric mobility vehicle. A plurality of operation buttons, a display, and the like are provided at the setting portion 45.

As shown in FIG. 2, the electric mobility vehicle M includes a display 200 which protrudes from the upper end surface of the left control arm 43 toward the upper side. The display 200 is supported by the left control arm 43 by means of a support member 210 which extends from the upper end surface of the left control arm 43 toward the upper side.

The display 200 is a tablet computer in one example, however, any other known display devices may be used.

Information is sent to the display 200 from the controller 80 by wire or wireless, and the display 200 displays the received information. For example, this information includes at least one of information of driving speed of the electric mobility vehicle M, information related to the state of the battery BA, information of a position of an object to be avoided detected by sensors, such as stereo cameras (first sensor) 90 or the like, information of determination results of whether or not the object to be avoided interrupts the driving, map information, information of driving path, or the like. Also, the display 200 has an input means such as a touch screen function or the like, and the information input to the display 200 is sent to the controller 80.

Figure 5:
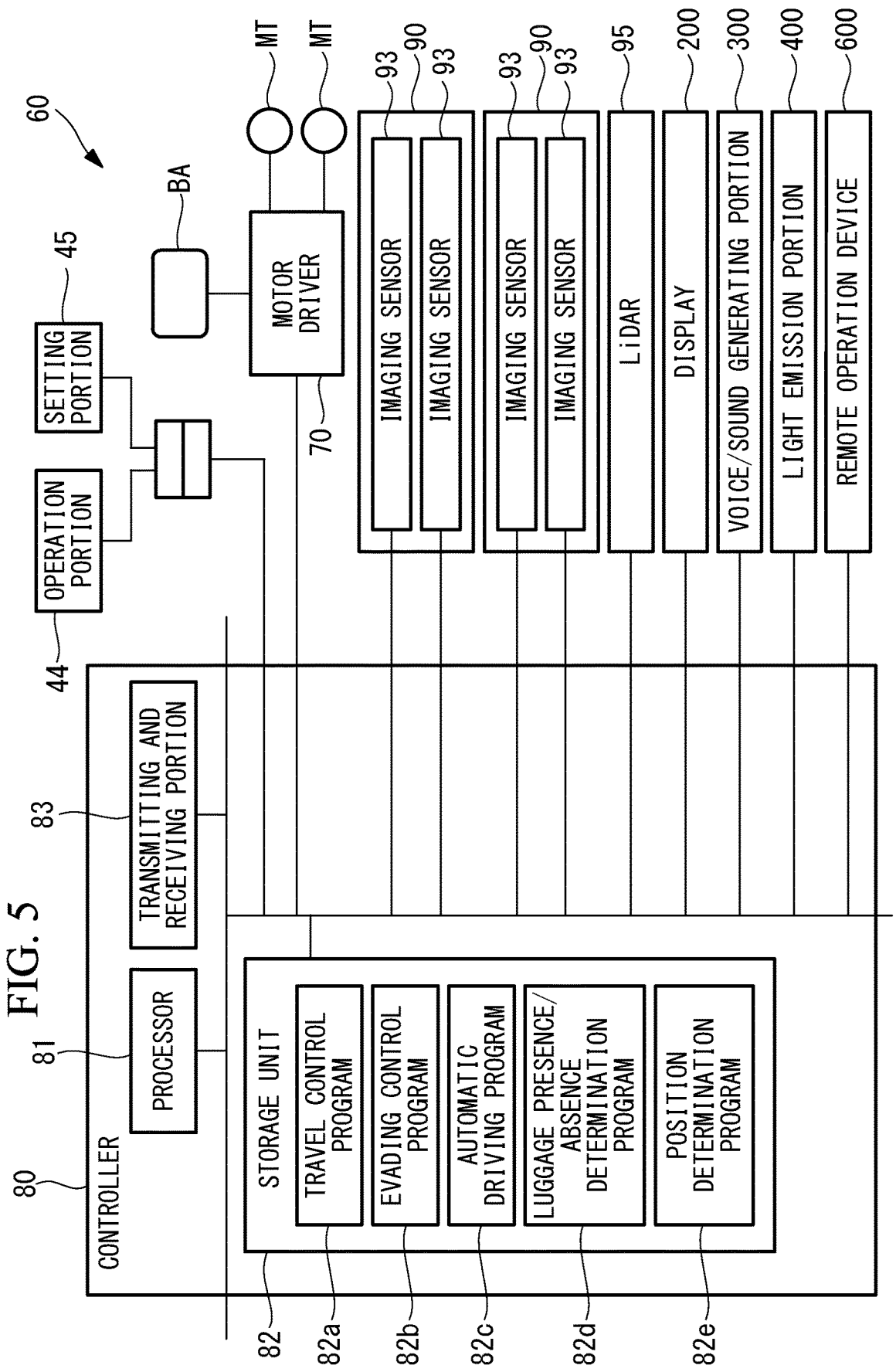
FIG. 5 is a block diagram of a control unit of the electric mobility of this embodiment.

As shown in FIG. 5, the control unit 60 has a motor driver 70 which drives the motors MT, and a controller 80.

The motor driver 70 is connected to the battery BA. Also, the motor driver 70 is connected to each of the motors 50 as well, and the motor driver 70 supplies drive power to the motors MT.

As shown in FIG. 5, the controller 80 includes a processor 81 such as a CPU and the like, a storage unit 82 having a non-volatile storage, a ROM, a RAM, and the like, and a transmitting and receiving portion 83 which transmits and receives information by wire or wireless. A travel control program 82*a* which controls the electric mobility vehicle M is stored in the storage unit 82. The processor 81 operates on the basis of the travel control program 82*a*. The processor 81 sends drive signals for driving the motors MT to the motor driver 70 on the basis of the signals from the operation portion 44 and the setting portion 45.

Figure 6:
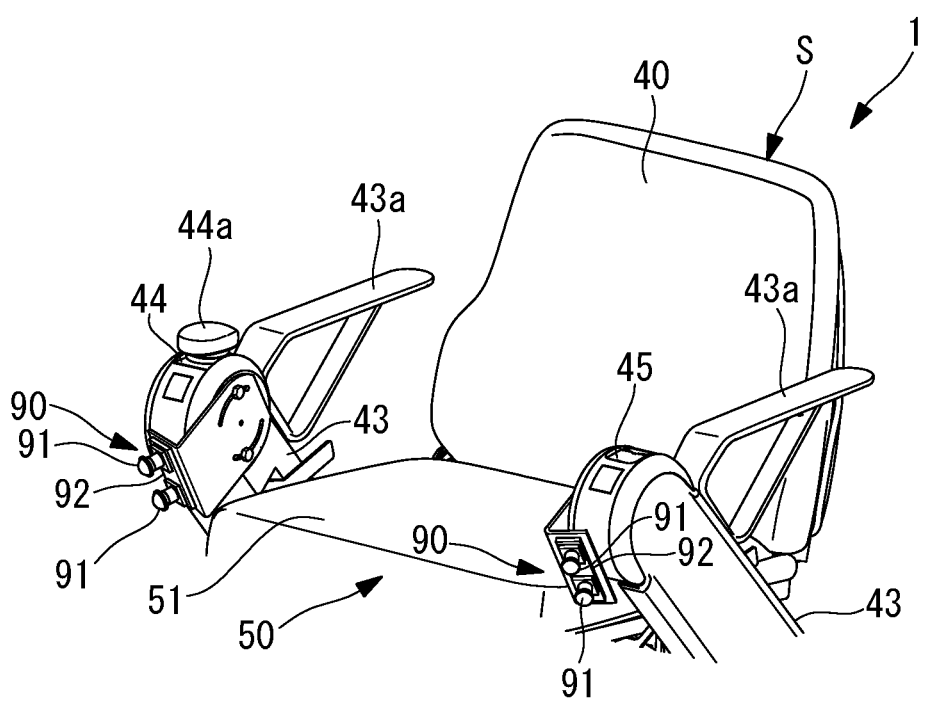
FIG. 6 is a perspective view of a seat unit of the electric mobility vehicle of this embodiment.

Stereo cameras (sensors) 90 are attached to the upper end side of the right control arms 43 and the upper end side of the left control arms 43. In such a case where the control arm 43 is not provided, the stereo camera 90 may be provided at the front end side of the arm rest 43*a*. As shown in FIG. 6, each of the stereo cameras 90 includes a pair lens units 91, and a camera main body 92 which supports the pair of lens units 91. In FIG. 6, a cover is removed so as to show internal structure of the stereo camera 90, and the seat unit S and the like are schematically drawn.

Figure 7:
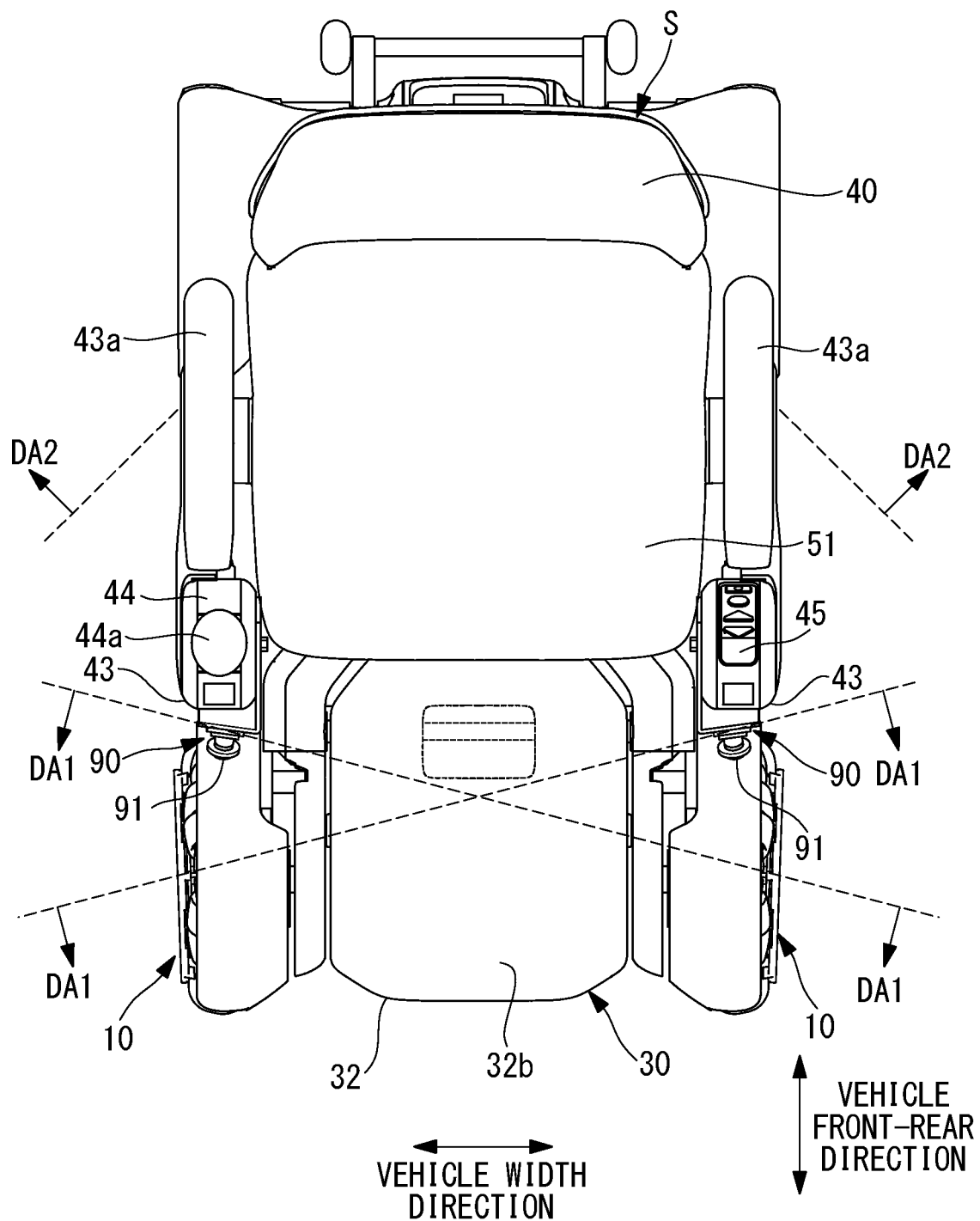
FIG. 7 is a plan view of the electric mobility of this embodiment.

A pair of imaging sensors 93 (FIG. 5) is provided inside the camera main body 92, and the pair of imaging sensors 93 correspond to the pair of lens units 91, respectively. The imaging sensors 93 are known sensors, such as a CMOS sensor or the like. The imaging sensors 93 are connected to the controller 80. In one example, a detection area DA1 of the stereo camera 90 is located at the front side of the electric mobility vehicle and the outside in the width direction of the front wheels 10 (FIG. 7).

A luggage carrier 42 is provided in the rear end portion of the mobility main body 30 or the back surface side of the seat unit S. As shown in FIGS. 2 and 3, in this embodiment, the luggage carrier 42 is supported by the rear end portion of the mobility body 30 and the back surface of the seat unit S. The luggage carrier 42 has a pair of frames 46 extending in the vertical direction along a backrest portion 40. The pair of frames 46 also support the backrest portion 40. This configuration is advantageous for downsizing the electric mobility vehicle in the front-rear direction.

The luggage carrier 42 has a pair of lower surface frames 47 each of which extends from the lower end of the frame 46 toward the vehicle rear side, and a back surface frame 48 which connects the pair of lower surface frames 47 to each other, and which extends from the pair of lower surface frames 47 toward the upper side. The pair of lower surface frames 47 are supported by the mobility main body 30, for example. Also, the luggage carrier 42 has a lower surface plate 47*a* which is supported by the pair of lower surface frames 47, and a back surface plate 48*a* which extends from the rear end of the lower surface plate 47a toward a position close to the upper end of the back frame 48.

As shown in FIG. 3, a LiDAR (Light Detection and Ranging, or Laser Imaging Detection and Ranging) 95 is attached to the rear end portion side of the mobility body 30 or under the luggage carrier 42. In this embodiment, the LiDAR scans a laser beam over a detection area (a second intrusion detection area) DA2 shown in FIG. 7, and the LiDAR 95 detects the laser beam reflected by an obstacle. By using this detection result, the controller 80 detects a detection target in the detection area DA2, which is located at the outside of the electric mobility vehicle in the width direction, and rear side of the electric mobility vehicle. For example, the detection target is an obstacle, human, animal, and plant. The obstacle may be a wall, a large stone, a bump, and the like. In another example, the LiDAR 95 may detect a detection target such as a step, a hole, a gutter, or the like, in which the rear wheel 20 may be fallen or get caught. Also, each of the stereo cameras 90 detects the detection target over the detection area DA1 in FIG. 7.

Also, another stereo camera for detecting the detection target located at the rear side and the sides in the width direction of the electric mobility vehicle M may be provided, another sensor capable of detecting the obstacles, such as a known radar, a milliwave sensor, or the like may be provided. Moreover, in order to detect the detection target located at the outside of the front wheels 10 in the width direction and the front sides of the front wheels 10 of the electric mobility vehicle, the LiDAR, the radar, the milliwave sensor, or the like may be provided, instead of the stereo camera 90.

A processor 81 of the controller 80 operates on the basis of an evading control program 82b and an automatic driving program 82c which are stored in the storage unit 82. The controller 80 creates distance images by processing the parallax images of the stereo camera (sensor) 90. The controller 80 detects the detection target. And, the controller 80 conducts known self-position estimation by using the detection result of a GPS reception device, an odometer, the stereo cameras 90, the LiDAR 95, and the like provided in the electric mobility vehicle. Also, on the basis of the detection target detected as described above, the map data stored in the storage unit 82, and the self-position estimation result, the controller 80 can perform the route-setting and the automatic driving from the place of departure to the destination, for example.

The controller 80 controls the motors MT by control signals for evading operation and/or operates a notification device when the controller 80 detects the detection target in a predetermined area in the detection areas DA1 and DA2, for example. Examples of the evading operation include reduction or stopping of the rotation speed of the motors MT (automatic stop function), controlling the motors MT so as to restrict the movement of the electric mobility vehicle toward the side of the object to be avoided, or the like. An object to be avoided is a detection target which is located closer than a predetermined distance (2 m, 1 m, several tens of centimeters, or the like) with respect to the sensor among the detection targets, and which is highly possible to prevent the movement of the electric mobility vehicle M.

This system can be applied to various airport terminals T. As one example, this system is explained by using a schematic view of an airport terminal T which is shown in FIG. 1. Also, in this embodiment, as one example, the electric mobility vehicles M are used in a space for passengers after passing the security check in the airport terminal, however, the electric mobility vehicles M may be used in other areas in the airport terminal T.

In one example, in the airport terminal T, a station (a standby area) 2 is provided in the vicinity of an exit of a security screening area 1, and a plurality of the electric mobility vehicles M are placed at the station 2. Also, a reception counter 3 in the vicinity of the station 2, and computers 4 are placed at the reception counter 3. The computer 4 is a known computer, such as a laptop computer, a tablet computer, or the like. The computers 4 are connected with the server 100 via a communication network, a communication line, or the like.

As shown in FIG. 8, the server 100 includes a processor 101 having a CPU, a RAM, and the like, a storage unit 102 having a non-volatile storage, a ROM, and the like, a display 103, and a transmitting and receiving portion 104 which transmits and receives information by wire or wireless. Management data 102a for managing the plurality of electric mobility vehicles M is stored in the storage unit 102. The management data 102a is data for displaying a management table on a display 5 of the computers 4 and on the display 103 of the server 100 on the basis of the management data 102a.

In one example, the management data 102a is data for displaying the management table shown in FIG. 9 on the displays 5, 103. The management table shown in FIG. 9 includes a timetable. Identification information of each of the electric mobility vehicles M is written in a corresponding one of the table lines in the time table, vehicle information of the corresponding electric mobility vehicle M, an estimated time of use by a user (usage information), a status of use by the user (usage information), and the like are written in each of the plurality of table lines in the management table. The estimated time of use by the user is shown in a time axis area where the time axis is written in the time table. In this embodiment, the status of use by the user is also shown in the time axis area.

In an example of FIG. 9, the electric mobility vehicle M of Number 1 is reserved by a user B from 10:30 to 12:00. And, the electric mobility vehicle M of Number 2 is not reserved during the time period shown in FIG. 9. The reservation status of each of the electric mobility vehicles of Number 3 and subsequent numbers are also displayed. The reservation status is one example of the estimated time of use.

Also, in FIG. 9, the electric mobility vehicle M of Number 1 is being used by User A from 8:00. This is displayed on the management table of FIG. 9 as one example of the status of use. In FIG. 9, the electric mobility vehicle M of Number 3 is on the way back to the station 2 by the automatic driving after User C finished using the electric mobility vehicle M. In this case, as one example of the status of use, it is shown in the management table of FIG. 9 that using the electric mobility vehicle M of Number 3 is finished.

Also, a charging state of the battery BA, a travel state of the electric mobility vehicle M, a detection state of the seating sensor 53 attached to the electric mobility vehicle M, and a presence/absence state of a luggage on the luggage carrier 42, and the like are displayed as the vehicle information in an area other than the time axis area of the time table. The electric mobility vehicle M is driven manually, stopped manually, driven automatically, stopped automatically, and the like are displayed as the travel state. As another example, a state that the electric mobility vehicle M is manually driven or automatically driven is displayed as the travel state.

In one example, as shown in FIG. 3, an occupancy sensor (visual sensor) 49 is attached to the upper end portion of the luggage carrier 42 so that at least an upper surface of a lower surface plate 46 of the luggage carrier 42 is located in a field of view (a detection range) of the occupancy sensor 49. As the occupancy sensor 49, a two-dimensional camera, a three-dimensional camera, a three-dimensional distance sensor, a LiDAR, or the like can be used. A luggage presence/absence determination program 82d is stored in the controller 80. The controller 80 operates on the basis of the luggage presence/absence program 82d, and by using image data obtained by the occupancy sensor 49, the controller 80 determines whether or not the luggage is detected on the luggage carrier 42.

Also, instead of the visual sensor, a sensor such as an obstacle detection sensor, a load sensor, a known radar sensor, or the like may be provided as the occupancy sensor 49. The object detection sensor is a known photo electronic sensor or the like, and the load sensor is a known pressure sensor or the like. In these cases, the controller 80 determines presence/absence of the luggage on the luggage carrier 42 on the basis of the detection results of the object detection sensor, the load sensor, the radar sensor, or the like.

And, the detection result of presence/absence of the luggage on the luggage carrier 42 is displayed in the time table of FIG. 9 as the luggage presence/absence state.

As shown in FIG. 9, in the electric mobility vehicle M of Number 1 which is being used, an electric power amount consumed by being used in the described manner is calculated, and on the basis of this calculation result, an estimated charged state of the battery BA when the electric mobility vehicle M of Number 1 returns to the station (standby area) 2 may be displayed.

The system which is configured as described above is operated in the following manner, in one example.

Roughly, the system of this embodiment has a preparation step (Step S1), an assignment step (Step S2), an instruction step (step S3), a travelling step (Step S4), an automatic returning step (Step S5), and a post-processing step (Step S6). Steps S1 to S6 may not partially be operated in accordance with a situation and a request.

Figure 10:
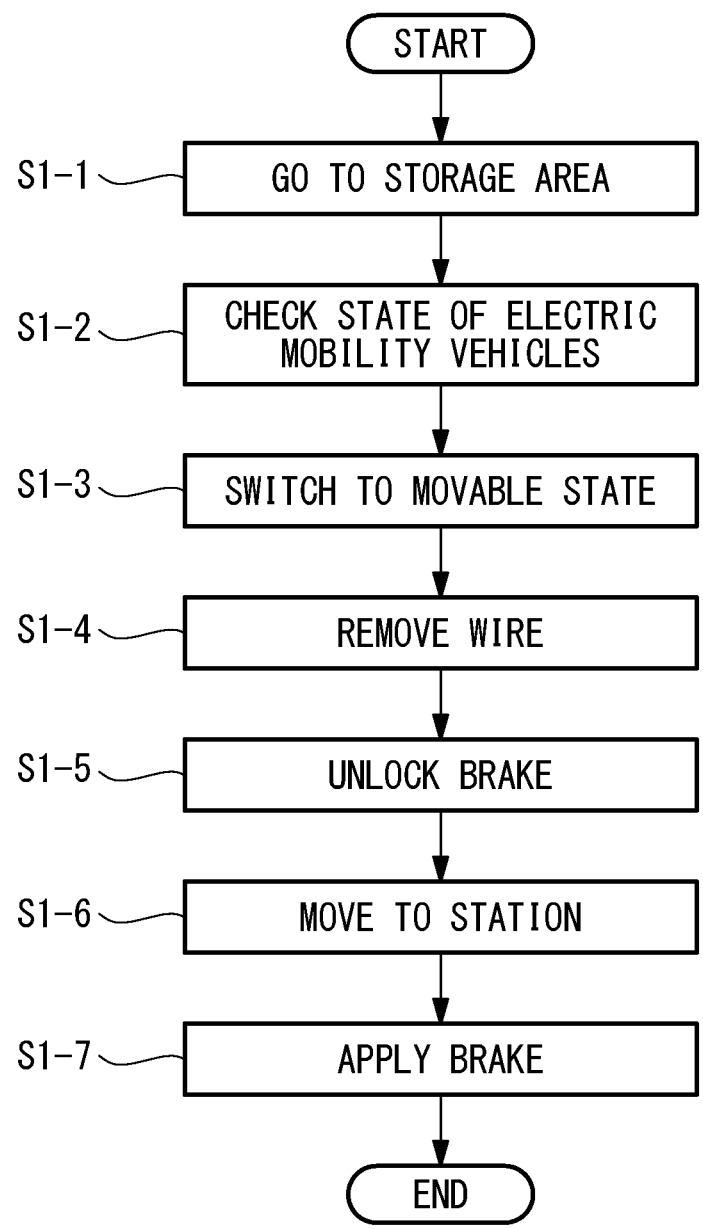
FIG. 10 is a flow chart showing one example of operations of this embodiment.

In Step S1, as shown in FIG. 10 for example, a provider of the service goes to a space, such as a storage area or the like, where the electric mobility vehicles M are stored (Step S1-1), and checks the state of each of the electric mobility vehicles M (Step S1-2). And, the electric mobility vehicles M which are in a stopping state become movable by turning on a main switch thereof (Step S1-3). In this state, software in the controller 80 of the electric mobility vehicle M is locked so that the electric mobility vehicles M cannot be moved even by operating the operation portion 44.

Subsequently, the provider of the service unlocks a physical lock, such as a wire lock and the like, of the electric mobility vehicles M (Step S1-4) and releases the brake of the electric mobility vehicles M (Step S1-5). Also, the provider of the service moves the plurality of electric mobility vehicles M to the station 2 (Step S1-6), and applies the brake on the electric mobility vehicles M (Step S1-7).

Figure 11:
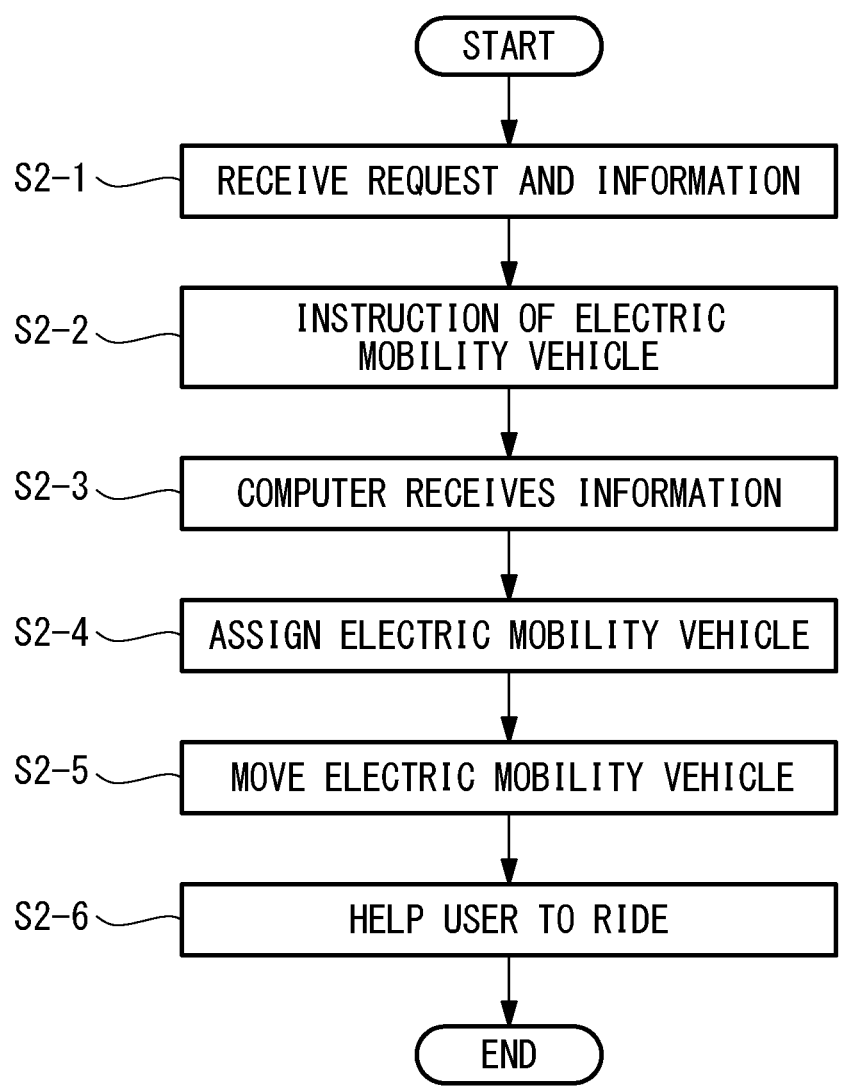
FIG. 11 is a flow chart showing one example of operations of this embodiment.

In Step S2, as shown in FIG. 11 for example, the provider of the service receives a request for using the electric mobility vehicle M and information from a user who wishes to use the electric mobility vehicle M (Step S2-1). The user may be a person who informs the request (reservation) including date of use of the electric mobility vehicle M by telephone or from online system, or a person who makes a request to use the electric mobility vehicle M including the date of use at the reception counter 3. Examples of the information include information written on the boarding pass, name of the user, a telephone number of the user, and the like. As the information, information in connection with a body of the user, information of sexuality of the user, information written on the passport of the user, and the like may be received, however, it is preferable that the amount of the information received from the user is small.

Subsequently, the provider of the service checks with the user what can be done, what cannot be done, manners, what is prohibited, and the like when using the electric mobility vehicle M, and whether or not the user can agree with the above (Step S2-2). In a case where Step S2-1 is performed by using the online system, a part of or a whole of Step S2-2 may be performed by using the online system. Also, Steps S2-1 and S2-2 can be performed in an opposite order or simultaneously.

The above described information is input to the computer 4 and/or the server 100 by using the input device 4a of the computer 4 or the like. At this time, based on the information of the boarding pass, the computer 4 or the server 100 may receive the flight information regarding the flight from other computer, such as a management computer in an airport. Also, the flight information of the boarding pass may successively be updated based on the information from the management computer in the airport.

Accordingly, the computer 4 receives the above described information (Step S2-3). The above described information which is input via the online system may be sent to the computer 4. The server 100 also receives the information which is received by the computer 4. In Step S2-3, especially, the computer 4 receives the flight information including at least one of the flight number, the boarding gate, and the boarding time which are written on the boarding pass. Also, the computer 4 is for operating or using the data of the server 100, and can be regarded as a part of the server 100, and therefore, the computer 4 will be treated and described as the server 100 in the following description.

Next, the server 100 assigns one of the plurality of the electric mobility vehicles M based on the date of use, the above described information, and the like (Step S2-4).

At this time, the server 100 associates the assigned electric mobility vehicle M with the above described information. Also the provider of the service may performs the assignment of Step S2-4. Then, if necessary, the provider of the service moves the assigned electric mobility vehicle M to a place close to the user from the station 2 (Step S2-5) and helps the user to ride and fasten a seatbelt (Step S2-6).

Figure 12:
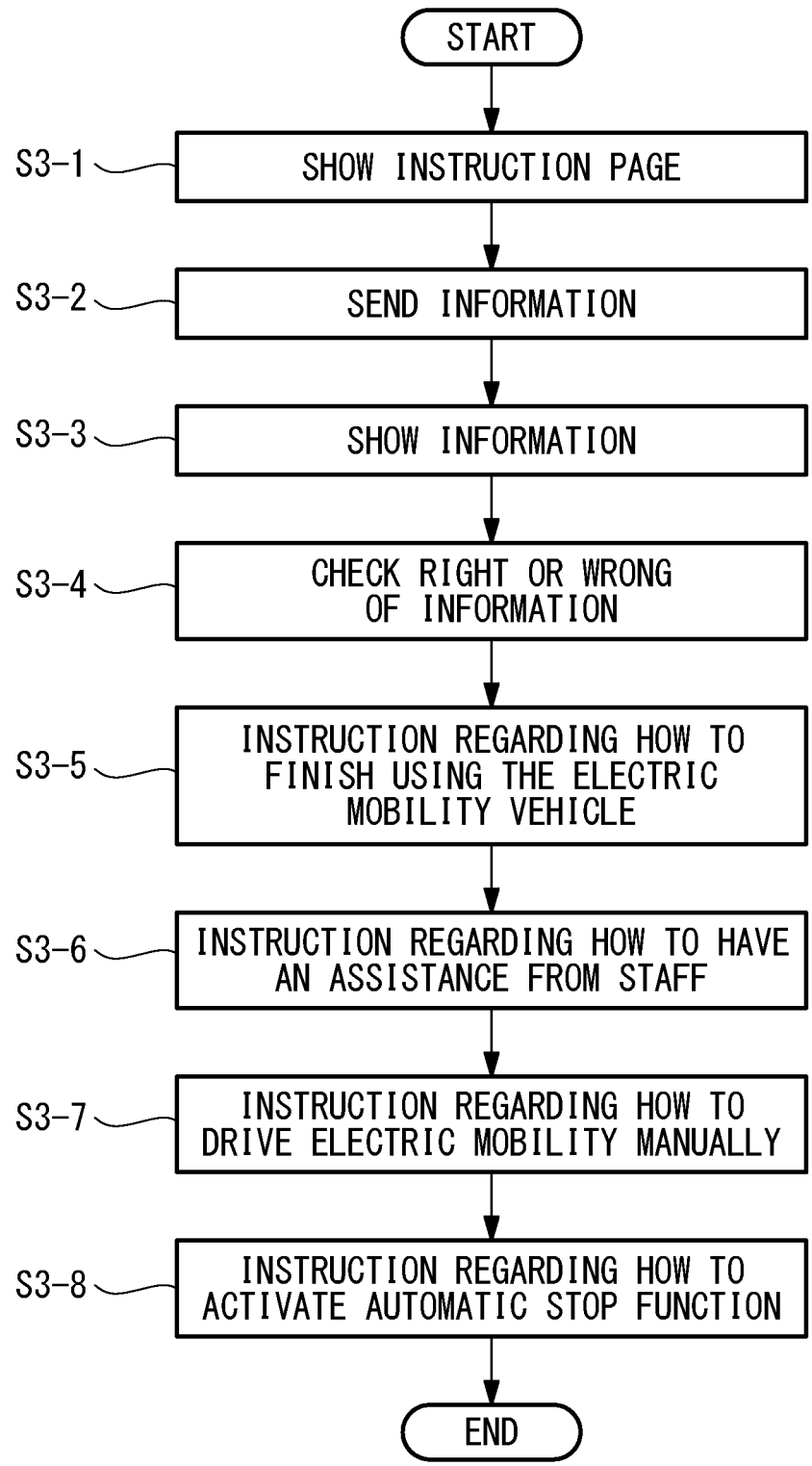
FIG. 12 is a flow chart showing one example of operations of this embodiment.

In Step S3, as shown in FIG. 12 for example, the provider of the service performs predetermined operation on the display 200, the setting portion 45, or the like, and therefore, an instruction page is displayed on the display 200 (Step S3-1). The predetermined operation cannot be done by the user.

Next, the server 100 sends the information of Step S2-3 to at least one of the controller 80 and the display 200 (Step S3-2), and the electric mobility vehicle M and the server 100 share the information.

Subsequently, at least a part of the information is displayed on the display 200 (Step S3-3), and the user checks propriety of the information (Step S3-4). Moreover, the provider of the service and/or the display 200 shows an instruction page and teaches the user how to finish using the electric mobility vehicle M (Step S3-5). Also, the provider of the service and/or the display 200 shows an instruction page and teaches the user how to get help from a staff, especially from the provider of the service (Step S3-6).

Furthermore, the provider of the service and/or the display 200 shows an instruction page and teaches the user how to drive the electric mobility vehicle M manually (Step S3-7). Also, the provider of the service and/or the display 200 shows an instruction page and teaches the user how to activate the automatic stop function (Step S3-8).

Figure 13:
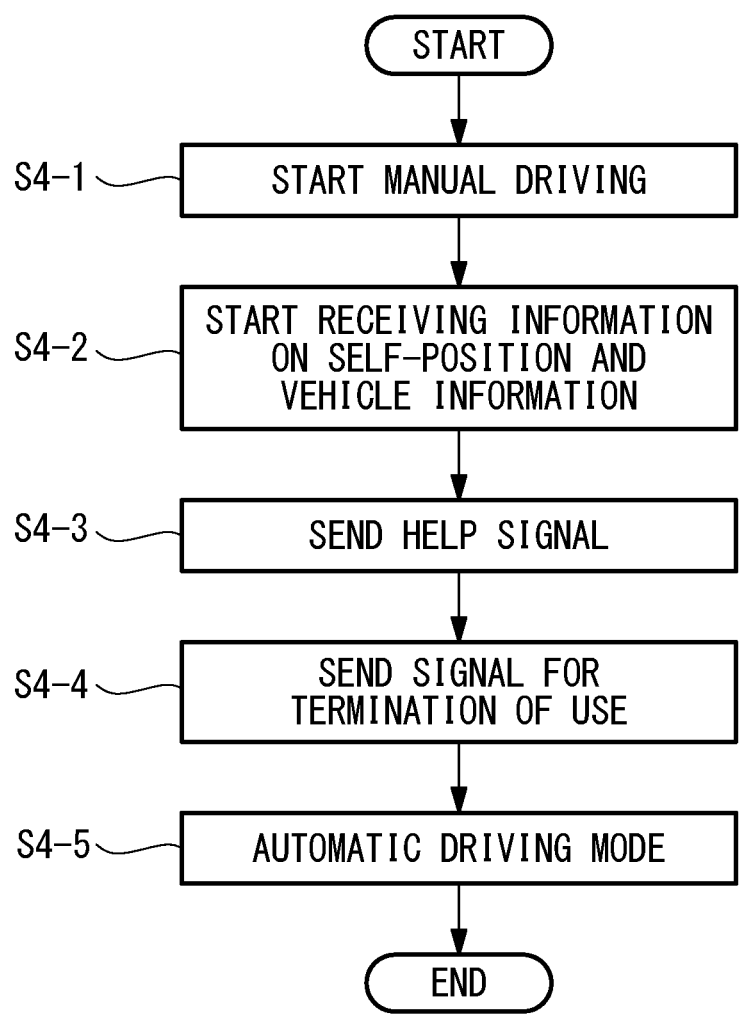
FIG. 13 is a flow chart showing one example of operations of this embodiment.

In Step S4, as shown in FIG. 13 for example, the user starts the manual deriving (operation) of the electric mobility vehicle M (Step S4-1). In Step S4-1, the electric mobility vehicle M may starts the automatic driving to move based on the user operation. In this case, the user uses the display 200 or the like to set a destination and the like. Also, the electric mobility vehicle M may be operated in combination of the manual driving and the automatic driving by the user. When the user goes to a gate corresponding to the flight number, there may be a case where the user stops by another destination and then goes to the boarding gate.

Meanwhile, the server 100 starts receiving an estimated result of the self-position, the vehicle information, and the like from the electric mobility vehicle M (Step S4-2).

When the user requires an assistance, the user performs the operation instructed in Step S3-6 by using the setting portion 45 or the like, and a signal for help is sent to the server 100. When the user finishes using the electric mobility vehicle M, the user performs the operation instructed in Step S3-5 by using the display (an intention receiving portion) 200, the setting portion (an intention receiving portion) 45, or the like, and a signal for the termination of use is sent to the server 200. This operation is for the user to input the intention of finishing the use of the electric mobility vehicle M. In one example, the display 200 shows a button for receiving the intention as the intention receiving portion which receives the intention of the termination of use. When the display 200 or the like has a voice input portion as the intention receiving portion, the user speaks his/her intention of termination using to the display 200, then the intention is received. There may be a case where the intention receiving portion is provided in the operation portion 44. When the intention is input to the intention input portion, the server 100 determines that the user has finished using the electric mobility vehicle M, and the electric mobility vehicle M is shifted in an automatic driving mode in which the electric mobility vehicle M cannot be moved by the operation portion 44 (Step S4-5). Also, when it is determined that a returning operation can be started in Step S5-1, which will be described below, without performing step S4-5, it may also be determined that the user has finished using the electric mobility vehicle M.

Figure 14:
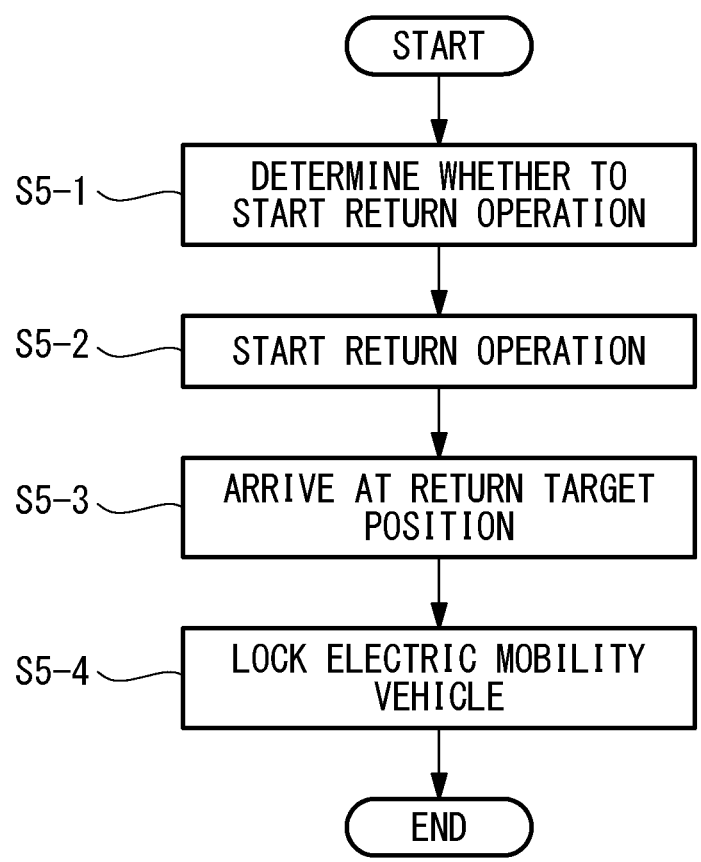
FIG. 14 is a flow chart showing one example of operations of this embodiment.

In Step S5, as described in FIG. 14 for example, the server 100 or the controller 80 determines whether or not the returning operation of the automatic mobility vehicle M can be started by the automatic driving mode (Step S5-1). The provider of the service may determine whether or not the returning operation of the automatic mobility vehicle M can be started by looking at the displays 103, 5, or the like of the server 100, and may input the determination result into the server 100.

The return operation is started based on the determination made in Step S5-1 (Step 5-2), and the electric mobility vehicle M reaches a return target position such as the station 2 (Step S5-3), and the electric mobility vehicle is in a locked state (Step S5-4).

Figure 15:
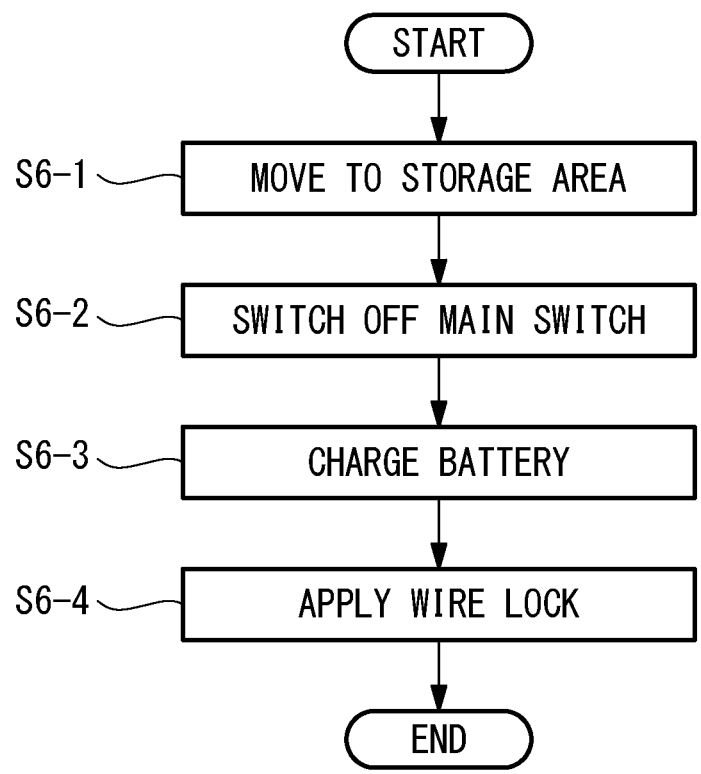
FIG. 15 is a flow chart showing one example of operations of this embodiment.

In Step S6, as shown in FIG. 15 for example, the provider of the service moves the plurality of electric mobility vehicles M placed at the station 2 to a storage space, such as a storage area or the like (Step S6-1). And, the provider of the service turns OFF the main switch of the electric mobility vehicles M (Step S6-2), and charges the battery BA of the electric mobility vehicles M if necessary (Step 56-3). Moreover, the provider of the service physically locks the electric mobility vehicles M which are moved to the storage area by using a wire and the like (Step S6-4).

In the above described operation and other operations, the user can communicate with the provider of the service via the display 200 or the like by operating the display 200 or the setting portion 45 at a time when the user is on the electric mobility vehicle M. This configuration contributes to give a sense of security to the user, to prevent the user from wrongly using the electric mobility vehicle M, or the like.

In the above described operation and other operations, when the user uses the electric mobility vehicle M, the provider of the service can check images captured by a camera 201 provided in the display 200. The camera 201 may be provided in other portion such as the control arm 43 or the like of the electric mobility vehicle M instead of the display 200. With the above mentioned configuration, the provider of the service can check the condition of the user, which is advantageous for securing the safety of the user, checking a health condition of the user, and the like.

In the above described operation and other operations, when the seating sensor is not detecting sitting of the user for a certain period of time during a time period which is after the user starts the manual driving of the automatic mobility vehicle M and before it is determined that the use of the electric mobility vehicle M is finished, the controller 80 may stop the electric mobility vehicle M. The certain period of time is a time period set to be equal to or longer than 1 second. In this case, the electric mobility vehicle M cannot be moved by the operation using the operation portion 44 or the like. This configuration is advantageous for securing the safety of the user. Also, it is advantageous for preventing the electric mobility vehicle M from being used by a third party without being authorized while the user is away. Information that the electric mobility vehicle M is being stopped is sent to the server 100, and the information is reflected on the management data 102a in the server 100.

By this, the displays 103, 5 display the management data 102a in a form of a time table which is shown in FIG. 9, the provider of the service recognizes the electric mobility vehicle M which is being forcefully terminated to use. Depending on the situation, the provider of the service may instruct the operator to go to a place where the electric mobility vehicle M is stopped so as to help the user who is on the forcefully terminated electric mobility vehicle M by using information of an existence position of the electric mobility vehicle M such as the estimated result of the self-position and the like.

Also, the server 100 may give the instruction. For example, as shown in FIG. 9, identification information of a plurality of the operators is written in the time table, and at least one of a work schedule and operation status of the corresponding operators are shown in each column. The server 100 sends the instruction to a terminal of the selected operator based on at least one of the work schedule and the operation status of the operators. As shown in FIG. 9, the existence positions of the electric mobility vehicles M and those of the operators may be shown in the time table or may be displayed on a map. The existence position of the electric mobility vehicles M may be a position obtained by the self-estimation, or may be a position measured by using a GPS receiver mounted on the electric mobility vehicles M. The existence positions of the operators are obtained in the same manner.

Here, the user may temporarily leave the seat unit S and go to toilet and the like. In this case, the user inputs his/her intention to temporarily leave from the electric mobility vehicle M via the display 200 or the setting portion 45, and the information regarding temporary leaving of the user is sent to the server 100, and this information is reflected on the management data 102a in the server 100. When inputting, a touch screen function of the display 200, an operation portion such as a button and the like in the setting portion 45, a voice input portion of the display 200, and the like play a function as an input portion. When the voice input portion is used, the user speaks a word(s) meaning that the user is about to temporarily leave from the electric mobility vehicle M to the display 200.

Accordingly, the management data 102a is displayed on the displays 103, 5 in the form of the time table of FIG. 9, the provider of the service can recognize the electric mobility vehicle M from which the user is temporarily leaving. Depending on the situation, the provider of the service or the server 100 can instruct the operator to go to a place where the electric mobility vehicle M exists so as to check the user who uses the electric mobility vehicle M from which the user is temporarily leaving by using the estimated result of the self-position of the electric mobility vehicle M.

Moreover, when the user is seated after leaving temporarily from the electric mobility vehicle M, a display which encourages the user to fasten a seatbelt is displayed. Also, the electric mobility vehicle M cannot be operated by the operation portion 44 until the user pushes a confirmation button displayed on the display 200. This configuration leads to encourage the user to fasten the seatbelt certainly. Also, when the user is seated after leaving temporarily from the electric mobility vehicle M, a notification device provided in the electric mobility vehicle M may notify to encourage the user to fasten the seatbelt. A voice/sound generating device 300 such as a speaker and the like may be used as the notification device.

In the above described operation and other operations, the occupancy sensor 49 is not detecting the luggage on the luggage carrier 42 for a certain period of time during a time period which is after the user starts the manual driving of the electric mobility vehicle M and until it is determined that the use of the electric mobility vehicle M is finished, the controller 80 of the electric mobility vehicle M informs the absence of the luggage to the user. The certain period of time is a time period set to be equal to or longer than 1 second.

The notification operation includes, stopping of the electric mobility vehicle M, reducing the travel speed of the electric mobility vehicle M, displaying a certain display on the display 200, generating a predetermined sound, and a combination thereof. When a voice/sound generating device 300 (FIG. 5) such as a speaker and the like is provided in the electric mobility vehicle M, the predetermined voice/sound is generated from the voice/sound generating device 300. The voice/sound generating device 300 may be provided in the display 200.

With this configuration, the user notices that the luggage is dropped or is about to be dropped from the luggage carrier 42, which prevents lost luggage and the like caused by being dropped.

In the above described operation and other operations, the detection result of the occupancy sensor 49 which is detected during a period of time which is after the user starts the manual driving of the electric mobility vehicle M to move and until it is considered that the use of the electric mobility vehicle M is finished may be stored in a memory of the controller 80 or the server 100 for a certain period of time. The certain period of time is a few weeks, a few months, a few years, or the like. A detection result of the occupancy sensor 49 which is detected during a period of time which is after the user starts the manual driving of the electric mobility vehicle M to move and until the electric mobility vehicle M returns to the standby area may also be stored in the memory of the controller 80 or the server 100.

That is to say, data continuously detected by the occupancy sensor 49 is stored in the memory together with the detected time thereof. With this configuration, changes in the detection range of the occupancy sensor 49 are kept as a record, which is advantageous as a countermeasure for the lost luggage caused by being dropped and the like. For example, when the occupancy sensor 49 is a photo-electronic sensor, a load sensor, a radar sensor, or the like, the changes in the detection result can be seen from the data stored in the memory. Also, when the occupancy sensor 49 is a visual sensor and the luggage carrier 42 is in a detection range, a status of the luggage, the other object, or the like on the luggage carrier 42 can be checked afterwards by using the data stored in the memory. This is extremely advantageous for preventing troubles in relation with the luggage.

Also, in the above embodiment, the occupancy sensor 49 may detect not only objects placed on the luggage carrier 42, but also objects placed on the other place for the luggage of the electric mobility vehicle M and objects placed on the seat unit S. For example, when the visual sensor, which is the occupancy sensor 49, is supported above the luggage carrier 42 by a supporting member, such as a pole or the like, the luggage carrier 42 and the seat unit S are placed in the detection area of the visual sensor. In this case, the visual sensor captures images of luggage which is placed on the seat unit U by the user U, and stores them to the storage unit.

When the seat unit S is placed in the detection area of the occupancy sensor 49, the occupancy sensor 49 also works as the seating sensor 53.

The luggage carrier 42 is located at a back surface side of the seat unit S, and therefore, it is difficult for the user who is seated on the seat unit S to visually check the luggage on the luggage carrier 42. For that reason, the detection result of the occupancy sensor 49 may kept being displayed on the display 200 during a time period which is after the user starts the manual driving of the electric mobility vehicle to move and until the use of the electric mobility vehicle M is determined to be finished.

Also, a play button for displaying the detection result of the occupancy sensor 49 stored in the memory on the display 200 may be shown on the display 200. This play button may be provided physically on the display 200, or may be provided in the setting portion 45, or the like. When the user operates the play button, the user can check the movement of the luggage placed on the luggage carrier 42, the seat unit S, and the like.

In Steps S4-5 or S5-1, a determination on termination of the use which is a determination that the use of the electric mobility vehicle M by the user is finished, or a determination on a return operation which is a determination that the electric mobility vehicle M can start the return operation are made. At this time, the controller 80 or the server 100 may use the detection result of the seating sensor 53 and/or the detection result of the occupancy sensor 49.

For example, after the intention by the user regarding the termination of use of the electric mobility vehicle M is received by the intention receiving portion, and when a predetermined standby time has passed since the seating sensor 53 has not detected sitting of the user, the determination on the termination of use or the determination on the return operation may be made. Or, after the intention by the user regarding the termination of use of the electric mobility vehicle M is received and when the predetermined standby time has passed since no detection of sitting of the user by the occupancy sensor 49, the determination on the termination of use or the determination on the return operation may be made. The predetermined standby time is a time period set to be equal to or longer than 10 seconds. Accordingly, when the detection results of the seating sensor 53 and the occupancy sensor 49 are used, the determination on the termination of use or the determination on the return operation are more accurately made.

There may be a case where the user does not input the intention of the termination of use to the intention receiving portion in Steps S4-5 or S5-1. Or, the intention receiving portion may not be provided in the electric mobility vehicle M. In these cases, the controller 80 or the server 100 may use the detection result of the seating sensor 53 and/or the detection result of the occupancy sensor 49 to make the determination on the termination of use or the determination on the return operation.

For example, the determination on the termination of use or the determination on the return operation may be made when a scheduled departure time of the flight of the user has passed and a predetermined standby time has passed since no detection of sitting of the user by the seating sensor 53. Or, the determination on the termination of use or the determination on the return operation may be made when a scheduled departure time of the flight of the user has passed and a predetermined standby time has passed since no detection of sitting of the user by the occupancy sensor 49. The predetermined standby time is a time period set to be equal to or longer than 10 seconds.

In another example, the controller 80 or the server 100 analyzes the images captured by the visual sensor which is the occupancy sensor 49. And, the controller 80 or the server 100 generates predetermined voice/sound by the voice/sound generating device 300 or the like when a state in which any luggage of the user cannot be detected on the seat unit S, the luggage carrier 42 or the like continues for a long period of time. And, in a state in which the user or the luggage of the user does not appear on the seat unit S, the luggage carrier 42, or the like even a certain period of time has additionally passed afterwards, the controller 80 or the server 100 makes the determination on the termination of use or the determination on the return operation. The determination on the termination of use or the determination on the return operation may be made instead of generating the predetermined voice/sound by the voice/sound generating device 300.

In another example, the images captured by the visual sensor which is the occupancy sensor 49 are sent to the server 100, and the captured images are displayed on the displays 103, 5 or the like of the server 100. The provider of the service checks the captured images so as to make the determination on the termination of use or the determination on the return operation. At this time, the provider of the service may refer to the detection results of the seating sensor 53, whether or not the intention of the user regarding the termination of use, and the like. The intension of the user may be displayed on the timetable of the management data 102*a*.

Or, information that a boarding pass of the user passed through a boarding gate corresponding to the information of the boarding pass may be sent to the server 100 or the controller 80 from a computer at the boarding gate, a management computer of an airport, or the like. And, after the server 100 or the controller 80 receives the information that the boarding pass passed through the boarding gate, the detection result of the seating sensor 53 and/or the detection result of the occupancy sensor 49 are used so as to make the determination on the termination of use or the determination on the return operation.

In addition, based only on the information indicating that the boarding pass passed though the boarding gate, the server 100 or the controller 80 may make the determination on the termination of use or the determination on the return operation.

In the above description, after the intention receiving portion receives that the user is intended to finish using the electric mobility vehicle M, a control unit of the display 200 or the controller 80 may make the display 200 show a predetermined screen so as to inform the user of standby time until the electric mobility vehicle M returns automatically to the standby area. The predetermined display includes, for example, a countdown timer informing time until the electric mobility vehicle M starts the automatic driving, an indicator informing time until the electric mobility vehicle M starts the automatic driving, or the like. The controller 80 may generate predetermined voice/sound by using the voice/sound generating device 300. The predetermined voice/sound is, for example, countdown voice informing time until the electric mobility vehicle M starts the automatic driving, and the like.

By adopting this configuration, the user can move to a safe place which is away from the electric mobility vehicle M while recognizing the informed time. Also, when this configuration is adopted, the user can grasp time which can be taken for removing the luggage and the like after inputting the intention of the termination of use. Furthermore, when the user inputs the intention of the termination of use by mistake, the user can know that there is time for cancelling the input. These configurations contribute to the safe and comfortable use of the electric mobility vehicle M.

In the above embodiment, in one example, when the determination on the termination of use or the determination on the return operation is made, or after the determination on the termination of use or the determination on the return operation was made, and when the occupancy sensor 49 detects an object such as the luggage and the like, the controller 80 uses the voice/sound generation device 300 to generates predetermined voice/sound. The predetermined voice/sound informs that there is an object such as the luggage and the like is left on the electric mobility vehicle M.

In the above mentioned operation or other operations, when the electric mobility vehicle M is in the return operation by the automatic driving, and when the seating sensor 53 detects that something has been placed or something has been on the seat unit S for a certain period of time, the controller 80 stops the electric mobility vehicle M. The certain period of time is a time period set to be equal to or longer than one second, for example. This configuration prevents the third party from placing an object on the seat unit S intentionally or unintentionally and the like while the electric mobility vehicle M is in the return operation. For example, it may be assumed that the third party places an object such as the luggage and the like on the seat unit S without thinking deeply when the electric mobility vehicle M is temporarily stopped in the return operation. In this case, the electric mobility vehicle M stops its movement and therefore, an unnecessary trouble will be prevented before it happens.

In the above described operation or other operations, the electric mobility vehicle M may perform a notification operation notifying that the electric mobility vehicle M is moving to the standby area automatically when the electric mobility vehicle M is in the return operation by the automatic driving. As the notification operation, the controller 80 generates voice/sound informing that the electric mobility vehicle M is in the return operation from the voice/sound generating device 300. As the notification operation, the controller 80 may light a light emission portion 400, a warning light, or the like provided in the electric mobility vehicle M. In these cases, people around the electric mobility vehicle M can easily notice that the electric mobility vehicle M is automatically moving, which prevents unnecessary troubles.

In the above described operation or other operations, the user may ware or carry an identification element ID during a time period which is after the user started the manual driving of the electric mobility vehicle M and until it is determined that the electric mobility vehicle M is no longer used. The information of the identification element ID may be displayed on the time table of the management data 102*a*. The identification element ID can be a card, a bracelet, a helmet, a hat, an earphone with microphone, and the like having an identifier. The card may be attachable to clothes of the user, or may be hanged from the neck of the user. In this embodiment, the identifier is a beacon, a RFID tag, a GPS reception device, or the like. In this embodiment, the identifier is the beacon, and the controller 80 stores a position determination program 82*e* which determines a position of the corresponding identification element ID. The determination on the positions includes detection of a distance between the corresponding identification element ID and the electric mobility vehicle M. That is to say, it may be said that the distance between the identification element ID and the electric mobility vehicle M is the position of the identification element ID with respect to the electric mobility vehicle M.

In this embodiment, a plurality of identification element IDs are prepared at a reception counter 3, and each of the identification element IDs correspond to the electric mobility vehicles M.

For example, the user wears the identification element ID before riding on the electric mobility vehicle M, or when riding on the electric mobility vehicle M.

In one example, the controller 80 determines the positions according to strength of a signal which is sent from the identification element ID and which is received by the transmitting and receiving portion 83. In another example, the controller 80 determines the position of the identification element ID with respect to the electric mobility vehicle M by using the strength of the signal from the identification element ID received by the transmitting and receiving portion 83 and the strength of the signal from the identification element ID received by another beacon receiving device in a facility.

In a case where the identification element ID is a GPS receiving device, the controller 80 receives a measurement result of the position of the identification element ID from the GPS receiving device, and considers a relative position between the measurement result and the self-position of the electric mobility vehicle M as the determination result.

Also, the server 100 may receive the measurement result of the position from the identification element ID such as the GPS receiving device or the like, and determine the position of the identification element ID with respect to the electric mobility vehicle M from the measurement result and the self-position of the electric mobility vehicle M. Note that, a self-position estimated by the controller 80 or the like is used as the self-position.

For example, the controller 80 stops the electric mobility vehicle M when the controller 80 determines that the identification element ID is distant with respect to the electric mobility vehicle M by more than a predetermined distance. The same or the similar determination result in the server 100 may be sent to the controller 80, and the controller 80 stops the electric mobility vehicle M. In this case, the electric mobility vehicle M cannot be moved by the operation using the operation portion 44 and the like. This configuration is advantageous for securing the safety of the user. Also, it is advantageous for preventing the third party from using the electric mobility vehicle M without being authorized while the use is away.

Also, separation information showing that the identification element ID is distant with respect to the electric mobility vehicle M by more than the predetermined distance is sent to the server 100, and the separation information is reflected on the management data 102*a* in the server 100. By this, when the management data 102*a* is displayed on the displays 103, 5 in a form of a time table of FIG. 9, the provider of the service can recognize the electric mobility vehicle M which corresponds to the separation information. The separation information may include information of the distance between the electric mobility vehicle M and the identification element ID.

Depending on the situation, the provider of the service uses the existence portion information of the electric mobility vehicle M, such as the estimation result of the self-position and the like so that the provider of the service can instruct the operator to go to a place where the electric mobility vehicle M exists in order to assist the user of the electric mobility vehicle M corresponding to the separation information. Similar to or the same as the case of the forced termination, the server 100 may give the instruction to the operator. To determine whether the instruction should be made or not, the provider of the service or the server 100 may take the position information of the electric mobility vehicle M into consideration.

And, the controller 80 or the server 100 may use the detection result of the position of the identification element ID with respect to the electric mobility vehicle M so as to make the determination on the termination of use or the determination on the return operation.

In one example, after the intention of the user regarding the termination of use is received by the intention receiving portion, the determination on the termination of use or the determination on the return operation is made by using the determination result of the position of the identification element ID with respect to the electric mobility vehicles M. For example, after the intention of the user regarding the termination of use is received by the intention receiving portion, and when a state in which the position of the identification element ID is distant with respect to the electric mobility vehicle M by more than the predetermined distance has continued for a certain period of time, the determination on the termination of use or the determination on the return operation is made.

In Steps S4-5 or Step S5-1, there may be a case where the user does not input the intention of the termination of use. Or, the intention receiving portion may not be provided in the electric mobility vehicle M. In these cases, the controller 80 or the server 100 may make the determination on the termination of use or the determination on the return operation when a certain standby time has elapsed in a state where the position of the identification element ID is distant with respect to the electric mobility M for more than the predetermined distance.

For example, when a departure time of a flight of the user has passed, or when the predetermined standby time has passed in a state where the position of the identification element ID is distant with respect to the electric mobility vehicle M by more than the predetermined distance, the determination on the termination of use or the determination on the return operation may be made.

Also, after the server 100 or the controller 80 receives the information indicating that the boarding pass has passed through the boarding gate, the determination on the termination of use or the determination on the return operation may be made by using the determination result of the positon of the identification element ID with respect to the electric mobility vehicle M as described above.

Also, an identification element input portion 500 for inputting the fact that the user has returned the identification element ID may be provided in each boarding gate (FIG. 1). In one example, the identification element input portion 500 is a computer which is operated by an airport stuff to whom the user hands to return the identification element ID. In another example, the portion may be a device which has a box for putting the identification element ID in and which is automatically input the fact that the identification element ID is returned by the user when the identification element ID is put in the box. In another example, the portion may be a device which has an antenna for detecting passing of the identification element ID through the boarding gate, and which is automatically input the fact that the identification element ID is returned by the user when the identification element ID passes through a corresponding boarding gate.

In this case, the controller 80 or the server 100 can use the information received from the identification element input portion 500 so as to make the determination on the termination of use or the determination on the return operation.

When the identification element ID is used as described above, in Step S2-1, an amount of the information received from the user may be reduced, and this simplifies procedures in using the electric mobility vehicle M, which is preferable from a view point of protecting the personal information of the users. Also, wearing the identification element ID makes it easier for the surrounding people to recognize the users of the electric mobility vehicles M. For example, in a case where the user leaves temporarily from the electric mobility vehicle M to shop at a store or go to toilet, the surrounding people can distinguish the user of the electric mobility vehicle M.

Also, the above described service using the electric mobility vehicle M may be provided in facilities other than the airport terminal T. For example, the service can be provided facilities such as hospitals, train stations and the like.

A plurality of the standby areas may be provided in the operation. For example, the standby areas may be provided at positions corresponding to each of the gates. Also, after the user finishes using the electric mobility vehicle M, the electric mobility vehicle M may find a place where the electric mobility vehicle M can stay, and the found place may be used as the standby area. Examples of the place where the electric mobility vehicle M can stay include a space besides a wall and the like.

Also, in the above described operation, the controller 80 of the electric mobility vehicles M may receive the information received by the server 100. In this case, the management data 102a may be stored in the storage unit 82 of the controller 80. The management data 102a stores an estimated time of use by the user, a status of use by the user, a vehicle information, and the like of the electric mobility vehicle M.

Instead of Step S2-1, a request for using the electric mobility vehicle M and the above described information may be received by the controller 80 of the electric mobility vehicles M. For example, the request from the user and the above described information are sent to the control unit 80 via the server 100, the other computer, or the like. The request and the information may be input to the display 200, the setting portion 45, or the like of the electric mobility vehicle M. In this case, Step S2-2 is performed by using the display 200.

Instead of S2-3, the user may input the information by using the display 200 or the setting portion 45 of the electric mobility vehicle M which is to be used, and the controller 80 receives the information. In this case, Step S2-4 can be omitted and Step S2-5 can also be omitted.

And, Step S3-1 is performed by the display 200. Step S3-2 can be omitted. Also, Steps S3-3 to S3-8 are performed by using the display 200.

Next, Steps S4-1 to S4-3 are performed, and instead of Step S4-4, the signal of the termination of use is received by the controller 80. And, the controller 80 makes determination on the termination of use or the determination on the return operation. The controller 80 makes determination on the termination of use or the determination on the return operation in a manner which is the same as or similar to that of the server 100.

When the determination on the termination of use or the determination on the return operation is made, the controller 80 makes the electric mobility vehicle M return to the standby area by the automatic driving. The electric mobility vehicle M may find a place where the electric mobility vehicle M can stay, and the found place may be set as the standby area when the determination on the termination of use or the determination on the return operation is made.

In the above described embodiment, after the determination on starting the return operation (determination on the return operation) is made and/or after the determination on the termination of use of the electric mobility vehicle M by the user (the determination on the termination of use) is made, and when the controller 80 stops the electric mobility vehicle M by stopping each motors MT in order to avoid the object to be avoided based on the automatic driving program 82c, the user may make a quick stop of the electric mobility vehicle M in comparison with a case where the user uses the electric mobility vehicle M (a using state by the user). The quick stop here means that a braking distance, a braking duration of time, and the like become shorter than those in the using state by the user. For example, in both the automatic driving mode and the manual riving mode, when the electric mobility vehicle M moves at a speed of 3.5 km/h, 4 km/h, or the like, when at least one of the braking distance and the braking duration of time, during which the electric mobility vehicle M moves at a travel speed of 3.5 km/h until the electric mobility vehicle M stops, becomes equal to or less than $\frac{2}{3}$ of those in the using state by the user, it is regarded as the quick stop.

For example, the controller 80 sets a target speed of the motors MT per a control cycle such as 0.1 second or the like, and the electric mobility vehicle M is stopped by reducing the target speed per the control cycle by a predetermined value. In this case, in order to make the quick stop, the controller 80 increases the predetermined value, or shorten the cycle. That is to say, in the above described case, the electric mobility vehicle M controls the rotation speed of the motors MT to reduce the speed of the electric mobility vehicle M and stops. Instead of this, when a physical brake is provided in the electric mobility vehicle M, the brake may be used to make the quick stop of the electric mobility vehicle M.

Also, in the above embodiment, after the determination on the return operation and/or the determination on the termination of use are made as described above, based on the automatic driving program 82c, when the speed of the electric mobility vehicle M is reduced to a predetermined low speed by lowering the rotation speed of the motors MT in order to avoid the target to be avoided, the controller 80 may sharply decelerates the speed in comparison with a case where the user is using the electric mobility vehicle M (in the using state). The sharp deceleration of the speed here means that the braking distance, the braking duration of time, and the like, which are necessary for making the speed of the electric mobility vehicle M reach the predetermined low speed, become shorter in comparison with the using state. For example, in both of the driving modes, when the electric mobility vehicle M moves at a speed of 3.5 km/h, 4 km/h, or the like, in a case where at least one of the braking distance and the braking duration of time during which the travel speed of the electric mobility vehicle M reaches a low speed which is from 3.5 km/h to 0.5 km/h is equal to or less than ⅔ of those in the using state by the user, it is regarded as the sharp deceleration of the speed.

The above described configuration allows the electric mobility vehicle M to return to the standby area faster. This contributes to reduce the standby time of the user, and the above described configuration is advantageous for stably providing the service using the plurality of electric mobility vehicles M in facilities.

As described above, in a state where the seating sensor 53 is not detecting sitting of the user, the quick stop or the sharp deceleration is allowed. Therefore, this prevents a situation in which the user on the electric mobility vehicle M becomes unstable and the like due to the quick stop or the sharp deceleration from happening. Also, as described above, in a state where the occupancy sensor 49 is not detecting the luggage on the luggage carrier 42, the quick stop or the sharp deceleration is allowed. Therefore, this prevents the possible disadvantages for the user, such as dropping the luggage or the like due to the quick stop or the sharp deceleration.

Further, it is more preferable that the quick stop or the sharp deceleration is allowed in a state where the seating sensor 53 is not detecting sitting of the user, and, the occupancy sensor 49 is not detecting the luggage on the luggage carrier 42.

Also, as described above, a visual sensor such as the occupancy sensor 49 and the like in which the seat unit S enters the detection area may be used as the seating sensor 53. Accordingly, a camera 201 of the display 200 in which the seat unit S enters the detection area may be used as the seating sensor 53.

Also, when stopping or reducing the speed of the electric mobility vehicle M, which is not only for a timing of avoiding the target to be avoided but also for another timing, it is possible to make the braking distance, the braking duration of time, and the like shorter than those in the using state by the user.

For example, a configuration in which the controller 80 controls the motors MT on the basis of the input made to a remote operation device 600 (FIG. 5) which communicates wirelessly with the controller 80 is adopted, and when stopping or reducing the speed of the electric mobility vehicle M based on operation on the remote operation device 600 by an operator (a helper and the like), it is also possible to make the braking distance, the braking duration of time, and the like shorter than those in the using state by the user. The remote operation device 600 is a tablet computer, a portable computer, and the like. For example, the portable computer is a mobile phone (a smart phone) in which predetermined application software is installed, and this mobile phone plays a function as the remote operation device 600. In these cases, for example, an input screen in which the travel direction and the travel speed of the electric mobility vehicle M can be designated is displayed on a display of the remote operation device 600, and one example of the input screen is an illustration of a joystick. In this embodiment, an illustration of a control device such as the joystick or the like is displayed on the mobile phone (smart phone) in which the predetermined application software is installed, and the operator inputs the travel direction and the travel speed of the electric mobility vehicle M by operating the displayed joystick, and the controller 80 controls the motors MT based on the input.

When the above described configuration is adopted, in a state where the seating sensor 53 is not detecting sitting of the user and/or the occupancy sensor 49 is not detecting the luggage on the luggage carrier 42, the quick stop or the sharp deceleration on the basis of the operation of the joystick may be allowed. By this, the travel time to a destination of the electric mobility vehicle M can be shorter in a state where neither the user nor the luggage is on the electric mobility vehicle M, which contributes to reduce the standby time of the user and the like.

Also, it is also possible to use the remote operation device 600 to switch the states between the state where the quick stop or the sharp deceleration is allowed and the state not allowed. In this case, a control mode of the controller 80 is switched between the state where the quick stop or the sharp deceleration is allowed and the state not allowed based on a signal from the remote operation device 600. In this case, the control mode can also be switched between the state where the quick stop or the sharp deceleration is allowed and the state not allowed based on the signal from the remote operation device 600 regardless of the detection results of the seating sensor 53 and the occupancy sensor 49. By adopting those configurations, the travel time to the destination of the electric mobility vehicle M can further be shortened, which contributes to reduce the standby time of the user and the like.

Also, in the above described embodiment, after making the determination on the return operation and/or the determination on the termination of use, and when the controller 80 makes the electric mobility vehicle M perform the return operation by the automatic driving mode based on the automatic driving program 82c, it also is possible to set a minimum rotation radius of the electric mobility vehicle M to be equal to or less than ⅔ of the minimum rotation radius of the electric mobility vehicle M which is used by the user in the automatic driving mode (in the using state by the user). The minimum rotation radius is a minimum rotation radius which is allowed in each of the two driving modes. With the above described configuration, the electric mobility vehicle M moves faster to the standby area. Also, when the electric mobility vehicle M rotates ideally on the plan surface, the rotation radius is 0 cm or a value close to 0 cm.

Moreover, after switching the control mode to the allowed state by the input made to the remote operation device 600, the minimum rotation radius of the electric mobility vehicle M can be equal to or smaller than ⅔ of the minimum rotation radius at the time when the user uses the electric mobility vehicle M in the automatic driving mode (in the using state by the user).

By changing the travel mode of the electric mobility vehicle M, such as allowing the quick stop of the electric mobility vehicle M, allowing the sharp deceleration of the electric mobility vehicle M, reducing the minimum rotation radius of the electric mobility vehicle M in the automatic driving mode, and the like, the electric mobility vehicle M can return to the standby area faster, but the same or the similar effect can be obtained by sifting to the other travel modes. For example, the other travel modes include allowing rapid acceleration of the electric mobility vehicle M, acceleration of a maximum speed of the electric mobility vehicle M, and the like, which are the similar and the same as the quick stop and the sharp deceleration. The rapid acceleration is to shorten a distance, time, and the like, which are necessary for placing the electric mobility vehicle M in a state where the travel speed thereof reaches a predetermined speed (3.5 km and the like) compared with those in the using state by the user. For example, when at least one of the distance and the time, which are taken until the travel speed of the electric mobility vehicle M is accelerated from 0 km/h to 3.5 km/h, becomes equal to or less than ⅔ of those in the using state by the user, it can be said that the electric mobility vehicle M is in the state of the rapid acceleration.

REFERENCE SIGNS LIST 4 computer
5 display
10 front wheel (wheel)
20 rear wheel (wheel)
30 mobility body
33 seat support portion
50 seat surface portion
42 luggage carrier
44 operation portion
45 setting portion (intention receiving portion)
49 occupancy sensor
51 cushion
52 under part structure
53 seating sensor
54 flexible member
55 detection device
60 control unit
80 controller
81 processor
82 storage unit
82b evading control program
82c automatic driving program
82d luggage presence/absence determination program
82e position determination program
100 server
102 storage unit
102a management data
200 display
300 voice/sound generating device
400 light emission portion
500 identification element input portion
600 remote operation device
M electric mobility vehicle
S seat unit
T airport terminal

The invention claimed is:

1. A system in facility comprising:
a plurality of electric mobility vehicles; and
a server which stores information of the plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
usage information of the one of the electric mobility vehicles by the user is stored in management data of the server, and
a seating sensor for a seat unit of the electric mobility vehicle and an occupancy sensor for a luggage carrier of the electric mobility vehicle is provide in the one of the electric mobility vehicles,
wherein the server or a controller of the one of the electric mobility vehicles uses both of a detection result of the seating sensor and a detection result of the occupancy sensor in order to determine termination of use of the one of the electric mobility vehicles by the user.

2. The system in facility according to claim 1, wherein
the one of the electric mobility vehicles is provided with an input unit to which a user intention of temporarily leaving the seat unit is input, and
when the user inputs the intention by using the input unit, information regarding the temporary leaving of the user is sent to the server from the one of the electric mobility vehicles, and the server reflects the information regarding the temporary leaving in the management data.

3. The system in facility according to claim 1, wherein the occupancy sensor is a visual sensor.

4. The system in facility according to claim 3, wherein captured images of the visual sensor are sent to the server, and the server displays the captured images using a display.

5. The system in facility according to claim 1, wherein
the management data includes information of a boarding pass of the user, and
the server or the controller of the one of the electric mobility vehicles controls the one of the electric mobility vehicles based on the information of the boarding pass.

6. A system in facility comprising:
a plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
at least one of a seating sensor of a seat unit of the electric mobility vehicle and an occupancy sensor of a luggage carrier of the electric mobility vehicle is provided in the one of the electric mobility vehicles, and
a controller of the one of the electric mobility vehicles or a server uses at least one of a detection result of the seating sensor and a detection result of the occupancy sensor to determine termination of use of the one of the electric mobility vehicles by the user,
wherein the one of the electric mobility vehicles informs the user of standby time with a countdown manner, wherein the standby time is time until the one of the electric mobility vehicles starts the automatic driving to move to the standby area.

7. The system in facility according to claim 6, wherein the server or the controller of the one of the electric mobility vehicles stops the one of the electric mobility vehicles when the seating sensor does not detect sitting of the user for a certain period of time during a period after the user starts moving the one of the electric mobility vehicles and until the user finishes using the one of the electric mobility vehicles.

8. The system in facility according to claim 6, wherein the one of the electric mobility vehicles informs to encourage the user to fasten a seatbelt by using a display or a notification device provided in the one of the electric mobility vehicles when the user who is-temporality temporarily away from the seat unit sits again on the seat unit.

9. The system in facility according to claim 6, wherein the occupancy sensor is a visual sensor,
captured images of the visual sensor are sent to a server, and
the server displays the captured images on a display.

10. The system in facility according to claim 6, wherein the one of the electric mobility vehicles has an intention receiving portion for receiving an intention input of usage termination, and
after the intention is received by the intention receiving portion, and when the seating sensor does not detect sitting of the user for more than a predetermined time, the one of the electric mobility vehicles determines termination of use of the one of the electric mobility vehicles by the user.

11. The system in facility according to claim 6, wherein the one of the electric mobility vehicles has a notification device capable of notifying that the electric mobility vehicle is moving to the standby area by the automatic driving.

12. The system in facility comprising:
a plurality of electric mobility vehicles; and
a server which stores information of the plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
usage information of the one of the electric mobility vehicles by the user is stored in a management data of the server, and
at least one of a seating sensor for a seat unit of the electric mobility vehicle and an occupancy sensor for a luggage carrier of the electric mobility vehicle is provided in the one of the electric mobility vehicles,
wherein
the management data includes information of a boarding pass of the user, and
the server or a controller of the one of the electric mobility vehicles determines the termination of use by the user, after the user goes through a boarding gate and an airport computer recognizes passing of the boarding pass through the boarding gate, based on the information of the boarding pass and information from the airport computer indicating that the boarding pass has passed through the boarding gate.

13. The system in facility comprising:
a plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
at least one of a seating sensor of a seat unit of the electric mobility vehicle and an occupancy sensor of a luggage carrier of the electric mobility vehicle is provided in the one of the electric mobility vehicles, and
a controller of the one of the electric mobility vehicles or a server uses at least one of a detection result of the seating sensor and a detection result of the occupancy sensor to determine termination of use of the one of the electric mobility vehicles by the user,
wherein the server or the controller of the one of the electric mobility vehicles stores detection results continuously detected by the occupancy sensor for a predetermined period of time.

14. The system in facility comprising:
a plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
at least one of a seating sensor of a seat unit of the electric mobility vehicle and an occupancy sensor of a luggage carrier of the electric mobility vehicle is provided in the one of the electric mobility vehicles, and
a controller of the one of the electric mobility vehicles or a server uses at least one of a detection result of the seating sensor and a detection result of the occupancy sensor to determine termination of use of the one of the electric mobility vehicles by the user,
wherein the one of the electric mobility vehicles is stopped when detection by the seating sensor is being performed for a certain period of time while the user is not sitting on the seat unit and the electric mobility vehicle is moving to the standby area by the automatic driving.

15. The system in facility comprising:
a plurality of electric mobility vehicles, wherein a user operates one of the electric mobility vehicles so as to move the one of the electric mobility vehicles in a facility, and when the user finishes using the one of the electric mobility vehicles, the one of the electric mobility vehicles moves to a standby area by automatic driving,
wherein
at least one of a seating sensor of a seat unit of the electric mobility vehicle and an occupancy sensor of a luggage carrier of the electric mobility vehicle is provided in the one of the electric mobility vehicles, and
a controller of the one of the electric mobility vehicles or a server uses at least one of a detection result of the seating sensor and a detection result of the occupancy sensor to determine termination of use of the one of the electric mobility vehicles by the user,
wherein the system further comprises an identification element which the user can wear,
wherein the controller of the one of the electric mobility vehicles or the server is capable of detecting a position of the identification element with respect to the one of the electric mobility vehicles.

16. An electric mobility vehicle comprising:
a wheel;
a motor which drives the wheel;
a controller which controls the motor; and
a seating sensor for a seat unit and an occupancy sensor for a luggage carrier, wherein
  the controller controls the motor by automatic driving to move the electric mobility vehicle to a standby area after a user finishes using the electric mobility vehicle, and
  the controller uses both of a detection result of the seating sensor and a detection result of the occupancy sensor to determine termination of use of the electric mobility vehicle by the user.

17. An electric mobility vehicle comprising:
a wheel;
a motor which drives the wheel; and
a seating sensor for a seat unit and an occupancy sensor for a luggage carrier, wherein
  in a user-using state, the electric mobility vehicle is controlled in an automatic driving mode or in a manual operation mode which is based on an input to an input portion provided in the electric mobility vehicle, wherein the user-using state is at least one of a state where the seating sensor is detecting sitting of a user and a state where the occupancy sensor is detecting a luggage on the luggage carrier, and
  wherein in the state where the seating sensor is not detecting the sitting of the user and the state where the occupancy sensor is not detecting the luggage on the luggage carrier, and when the motor is controlled by automatic driving or an input made to a predetermined remote control device, the electric mobility vehicle performs at least one of quick stop of the electric mobility vehicle, sharp deceleration of the electric mobility vehicle, rapid acceleration of the electric mobility vehicle, reducing a minimum rotation radius of the electric mobility vehicle, and increasing a maximum speed of the electric mobility vehicle, which are not performed in the user-using state.

* * * * *